(12) United States Patent
Kumar et al.

(10) Patent No.: US 12,367,004 B2
(45) Date of Patent: Jul. 22, 2025

(54) SYSTEM AND METHOD FOR SIMULTANEOUSLY DISPLAYING MULTIPLE GUIs VIA THE SAME DISPLAY

(71) Applicant: APP-POP-UP INC., Winnipeg (CA)

(72) Inventors: Rajeev Kumar, Disraeli (CA); Rakesh Kumar, Disraeli (CA)

(73) Assignee: APP-POP-UP INC., Winnipeg (CA)

( * ) Notice: Subject to any disclaimer, the term of this patent is extended or adjusted under 35 U.S.C. 154(b) by 281 days.

(21) Appl. No.: 18/127,317

(22) Filed: Mar. 28, 2023

(65) Prior Publication Data

US 2023/0236784 A1    Jul. 27, 2023

Related U.S. Application Data

(63) Continuation-in-part of application No. 17/951,415, filed on Sep. 23, 2022, now Pat. No. 11,768,648, which is a continuation of application No. 17/561,261, filed on Dec. 23, 2021, now Pat. No. 11,474,769, which is a continuation-in-part of application No. 17/443,563, filed on Jul. 27, 2021, now Pat. No. 11,543,882.

(51) Int. Cl.
*G06F 3/14* (2006.01)
*G06F 3/04845* (2022.01)
*G06F 3/16* (2006.01)
*G06F 9/451* (2018.01)
*G06Q 30/0241* (2023.01)

(52) U.S. Cl.
CPC ............ *G06F 3/14* (2013.01); *G06F 3/04845* (2013.01); *G06F 3/165* (2013.01); *G06F 9/451* (2018.02); *G06Q 30/0277* (2013.01); *G06F 2203/04803* (2013.01)

(58) Field of Classification Search
CPC ...... G06Q 30/0277; G06F 2203/04803; G06F 3/14; G06F 3/04845; G06F 3/165
See application file for complete search history.

(56) References Cited

U.S. PATENT DOCUMENTS

| | | | |
|---|---|---|---|
| 11,822,784 B2 * | 11/2023 | Luo ...................... | G06F 3/0484 |
| 11,972,102 B2 * | 4/2024 | Wheeler ............. | G06F 3/04817 |
| 2010/0079392 A1 * | 4/2010 | Chiang ............... | G06F 3/04886 |
| | | | 715/788 |

(Continued)

*Primary Examiner* — Tadesse Hailu
(74) *Attorney, Agent, or Firm* — PRAXIS

(57) ABSTRACT

There is provided a system for modulating a graphical user interface (GUI). The system comprising a user device and a system controller in communication therewith. The user device comprises a device controller and a display interface for displaying the GUI. Execution of processor executable code stored in the system controller or provided for storage in the user device by the system controller or by the device controller or by the combination thereof synergistically provides for the system controller or the device controller or the combination thereof with performing computer-implementable steps. The computer implementable steps comprise splitting the GUI into two or more sub-GUI portions positioned within the GUI frame boundary and providing for the two or more sub-GUI portions to simultaneously display respective content stored within the user device and/or hosted by the system controller and/or a same or different remote host controllers in communication with the user device.

28 Claims, 16 Drawing Sheets

(56) References Cited

U.S. PATENT DOCUMENTS

| | | | |
|---|---|---|---|
| 2013/0208785 A1* | 8/2013 | Abdo | H04N 19/119 |
| | | | 375/E7.127 |
| 2014/0157163 A1* | 6/2014 | Strutin-Belinoff | ............................ |
| | | | G06F 3/04883 |
| | | | 715/781 |
| 2015/0237290 A1* | 8/2015 | Lee | H04N 5/45 |
| | | | 348/570 |
| 2017/0357437 A1* | 12/2017 | Peterson | G06F 40/134 |
| 2018/0039387 A1* | 2/2018 | Cheong | G06F 1/3287 |
| 2018/0356972 A1* | 12/2018 | Wang | G06F 3/04883 |
| 2019/0028668 A1* | 1/2019 | Li | G06F 9/451 |
| 2019/0286462 A1* | 9/2019 | Bodnick | G06F 9/453 |
| 2020/0059776 A1* | 2/2020 | Martin | H04M 1/72439 |
| 2022/0391047 A1* | 12/2022 | Zhao | G06F 3/04883 |

* cited by examiner

SYSTEM AND METHOD FOR SIMULTANEOUSLY DISPLAYING MULTIPLE GUIs VIA THE SAME DISPLAY

CROSS-REFERENCE TO RELATED APPLICATIONS

The present application is a Continuation in part of U.S. patent application Ser. No. 17/951,415 filed on Sep. 23, 2022, which is a Continuation of U.S. patent application Ser. No. 17/561,261 filed on Dec. 23, 2021, which is a Continuation in part of and claims benefit of U.S. patent application Ser. No. 17/443,563 filed on Jul. 27, 2021 all three of which are incorporated herein by reference in their entirety.

TECHNICAL FIELD

The present disclosure generally relates to computer graphical user interfaces. More particularly, but not exclusively, the present disclosure relates to a system and method for simultaneously displaying multiple graphical user interfaces via the same display such as a screen.

BACKGROUND

A graphical user interfaces (GUI) is an interface through which a user interacts with electronic devices such as computers and smartphones through the use of icons, menus and other visual indicators or representations (graphics). A GUI is displayed via a display interface such as a display screen or a virtual screen created by the display screen of XR smart glasses for example. GUIs include the website being shown via a display interface or media windows streaming content and being positioned on a host GUI such as website as is known in various platforms like Facebook™ and YouTube™. While streaming content via a media window, the content is interrupted to stream other content such as an advertisement.

OBJECTS

An object of the present disclosure, there is provided a system for modulating a graphical user interface (GUI) for splitting the GUI into two or more sub-GUI portions.

SUMMARY

In accordance with an aspect of the present disclosure, there is provided a system for modulating a graphical user interface (GUI), the system comprising: a user device comprising a device controller with an associated memory and a display interface for displaying the GUI, the GUI defining a frame boundary thereof further defining a GUI size, the GUI comprising content displayed via the display interface; and a system controller in communication with the user device, the system controller having a processor with an associated memory of processor executable code for being executed by the system controller or for being downloaded into the memory of the user device controller to be executed thereby or to be executed synergistically by a combination of the system controller and the device controller, wherein execution of the processor executable code by the system conutroller or by the device controller or by the combination thereof synergistically provides for the system controller or the device controller or the combination thereof with performing computer-implementable steps comprising: splitting the GUI into two or more sub-GUI portions positioned within the GUI frame boundary; and providing for the two or more sub-GUI portions to simultaneously display respective content stored within the user device and/or hosted by the system controller and/or a same or different remote host controllers in communication with the user device.

In an embodiment, the computer-implementable steps comprise: detecting a real-time status selected from the group consisting of a device user status, a device status, an auxiliary device status, a content status, and a combination thereof; determining the detected real-time status based on status criteria stored within the memory of the system controller and/or the user device; modulating the GUI and/or the two or more sub-GUI portions on the basis of the determined real-time status. In an embodiment, the step of modulating comprises a step selected from the group consisting of: splitting the GUI into the two or more sub-GUI portions positioned within the GUI frame boundary; resizing at least one of the two or more sub-GUI portions; reconfiguring at least one of the two or more sub-GUI portions; removing at least one of the two or more sub-GUI portions; and modulating the displayed content; and a combination thereof.

In an embodiment, the user device comprises a sensor for detecting a user in detectable proximity to the device thereby detecting the real-time user status. In an embodiment, the sensor detects a sound of the user within the detectable proximity.

In an embodiment, the user device comprises smart glasses to be worn by the user, the smart glasses comprising at least one camera at an inner surface thereof for capturing images of an eye or eyes of the user, wherein the user status comprises an eye condition of the user. In an embodiment, the eye condition status of the user comprises a position of the eyes of the user, a direction of the eyes of user, a movement of the eyes of the user, a position of the eyelids of the user and a combination thereof. In an embodiment, the smart glasses further comprise an outer camera positioned at an outer surface of thereof for capturing hand movements of the user. In an embodiment, the device user condition comprises hand movements of the user.

In an embodiment, the user device comprises a camera for capturing images of the device user within a field of view (FOV) of the camera to detect the real-time user status. In an embodiment, the device user status is selected from the group consisting of a user condition status, a user facial status, a user type status and a combination thereof. In an embodiment, the condition status is selected from the group consisting of a presence of the user within the FOV of the camera, a movement of the user within the FOV of the camera, a position of the user within the FOV of the camera, a size of the user within the FOV of the camera, an eye condition status of the user within the FOV of the camera and a combination thereof.

In an embodiment, the position of the user is selected from a position of the body of the user, a configuration of the body of the user and a combination thereof.

In an embodiment, the eye condition status of the user comprises a position of the eyes of the user, a direction of the eyes of user, a movement of the eyes of the user, a position of the eyelids of the user and a combination thereof.

In an embodiment, the determining of the real-time detected user facial status comprises facial recognition of the user and wherein the stored status criteria comprises stored user profiles including registration of the face of the user for facial recognition. In an embodiment, the facial status of the user is selected from the groups consisting of an eye condition status of the user, a size of the face of the user, a position of the face of the user, a facial type of the user combinations thereof.

In an embodiment, the user type status is selected from the group consisting of an age type status, a gender type status, a size type status, a species type status and combinations thereof.

In an embodiment, the device status is selected from the group consisting of: a position of the device, a location of the device, a motion of the device, a use of the device, and combinations thereof. In an embodiment, the use of the device is selected from the group of the device displaying content via the display interface, receiving user input commands.

In an embodiment, the auxiliary device status is selected from the group consisting of an established communication between an auxiliary device and the user device, an input command to the user device via an auxiliary device, and a combination thereof, wherein the auxiliary device is a physical device and/or a virtual device.

In an embodiment, modulating the displayed content is selected from the group consisting of pausing streamed content, switching from one given streamed content to another given streamed content, rewinding streamed content, fast-forwarding streamed content, recalling previously streamed content to be streamed again in real-time and combinations thereof.

In an embodiment, when the GUI is split into the two or more sub-GUI portions positioned within the GUI frame boundary it defines a multiple display GUI, wherein the computer-implementable steps comprise: undocking a selected one of sub-GUI portions from the multiple display GUI thereby spatially separating the undocked sub-GUI portion therefrom, the undocked sub-GUI portion defining its own separate boundary frame and being selectively movable along the display interface. In an embodiment, the undocking is performed via a user input command thereof.

In an embodiment, the GUI comprises media content display window defining the boundary frame and being displayed on a host graphical user interface and the two or more sub-GUI portions comprise two or more sub-window portions, wherein the splitting step comprises splitting the media content display window into the two or more sub-window display portions positioned within the frame boundary of the media display window. In an embodiment, when the media window is split into the two or more sub-window portions positioned within the frame boundary thereof it defines a multiple display window, wherein the computer-implementable steps comprise: undocking a selected one of the sub-window portions from the multiple display window thereby spatially separating the undocked sub-window portion therefrom, the undocked sub-window portion defining its own separate boundary frame and being selectively movable along the host graphical user interface.

In an embodiment, the GUI prior to the splitting displays video game content with game input control images for receiving finger real or virtual touch input commands for game control wherein the input control images are displayed at respective given positions via the display interface, wherein the computer-implementable steps comprise maintaining the input control images at the same respective and given displayed positions via the display interface following the splitting of the GUI thereby overlying one or more of the two or more sub-GUI portions.

In an embodiment, the GUI comprises a framework, the computer-implementable steps further comprising: modulating the framework of the GUI thereby providing for the splitting thereof into the two or more sub-GUI portions and for providing for the two or more sub-GUI portions to simultaneously display the respective content.

In an embodiment, splitting the GUI into two or more sub-GUI portions positioned within the GUI frame boundary comprises decreasing the size of the GUI while correspondingly replacing the decrease in size by an increase in size of at least one new GUI wherein the decreased GUI comprises one of the two or more sub-GUI portions and the at least one new GUI comprises the other of the two or more sub-GUI portions.

In an embodiment, splitting the GUI into two or more sub-GUI portions positioned within the GUI frame boundary comprises inserting at least one new GUI within the GUI causing the GUI to be correspondingly reconfigured, wherein the reconfigured GUI comprises one of the two or more sub-GUI portions and the at least one new and inserted GUI comprises the other of the two or more sub-GUI portions.

In accordance with an aspect of the disclosure, there is provided a system for simultaneously displaying multiple graphical user interfaces via the same display, wherein the multiple graphical user interfaces are hosted by one or more remote host controllers, the system comprising: a user device in operative communication with the one or more remote host controllers and comprising an interface display for displaying one or more of the multiple graphical user interfaces; a system controller in operative communication with the user display device, the system controller having a processor with an associated memory of processor executable code that when executed provides the controller with performing computer-implementable steps comprising: separating the interface display in two or more interface display portions; and selectively providing for two or more of the graphical user interfaces to be simultaneously displayed via respective ones of the two or more interface display portions.

In an embodiment, the step of separating is automatically performed by the system controller. In an embodiment, the step of separating comprises the controller providing for the user to input a command via the user display device for separating the interface display. In an embodiment, the step of separating comprises the system controller providing an application to be stored in the user display device for separating the interface display in two or more interface display portions, wherein the system controller performs the computer implementable step of detecting that the interface display portion has been separated.

In an embodiment, computer-implementable steps further comprise resizing one of the two or more interface display portions to a full size of the interface display and removing remaining ones of the two or more interface display portions. In an embodiment, step of resizing is automatically performed by the system controller. In an embodiment, the step of resizing comprises the system controller providing for the user to input a command via the user display device for the resizing the one of the two or more interface display portions to a full size of the interface display and removing remaining ones of the two or more interface display portions. In an embodiment, the step of resizing comprises the system controller providing an application to be stored in the user display device for the resizing the one of the two or more interface display portions to a full size of the interface display and removing remaining ones of the two or more interface display portions, wherein the controller performs the computer implementable step of detecting that the interface display portion has been separated.

In an embodiment, the computer-implementable steps further comprise providing the interface display prior to the step of separating to display a main graphical user interface; and resizing the main graphical user interface during the step of separating reducing the size thereof fit into one of the two or more interface display portions thereby providing the main graphical user interface to continue being displayed.

In an embodiment, the computer-implementable steps further comprise selectively allowing sound from only one of the two or more of the graphical user interfaces to be emitted via the display device.

In an embodiment, the two or more of the graphical user interfaces are selected from the group consisting of: video content, media content, video game content, web pages, advertisement web pages, e-shopping web pages, e-banking web pages, financial transaction pages, browser pages, computer applications, interactive web pages, websites, social networks, telecommunication applications, videoconferencing applications and any combination thereof.

In an embodiment, one of the two or more graphical user interfaces comprises main content and the other of the two or more graphical user interfaces comprises auxiliary content. In an embodiment, the computer-implementable steps further comprise providing subject matter of the auxiliary content to be related to subject matter of the main content. In an embodiment, the computer-implementable steps further comprise selectively stopping advertisement blockers from blocking advertisement content in the auxiliary content.

In an embodiment, the computer-implementable steps further comprise providing for one or more of the two or more graphical user interfaces to comprise content uploaded from a geographic location that is near the geographic location of the user display device.

In an embodiment, one of the two or more graphical user interfaces comprises main content uploaded by a user having a user profile registered on in the memory of the system controller and another one of the two or more graphical user interfaces comprises advertisement content and shopping content, wherein the shopping content provides for device user to purchase goods and/or services, wherein the computer-implementable steps further comprise communicating with the remote host controller hosting the advertisement content and shopping content to detect if a purchase has been made; determining the user that uploaded the main content that was simultaneously displayed with the advertisement content and shopping content; and providing a reward to the determined user.

In an embodiment, the computer-implementable steps further comprise providing a user profile in the memory of the system controller; providing a system user to input commands in the user profile via the display device to register user preferences. In an embodiment, the computer-implementable steps further comprise separating the interface display based on the user preferences. In an embodiment, the computer-implementable steps further comprise selectively providing for two or more of the graphical user interfaces to be simultaneously displayed based on the user preferences.

In accordance with an aspect of the present disclosure, there is provided a method for simultaneously displaying multiple graphical user interfaces via the same display, wherein the multiple graphical user interfaces are hosted by one or more remote host controllers, the system comprising: providing interface display for displaying one or more of the multiple graphical user interfaces; separating the interface display in two or more interface display portions; and selectively providing for two or more of the graphical user interfaces to be simultaneously displayed via respective ones of the two or more interface display portions.

In an embodiment, an input command image is selected from the group consisting of and without limitation, an image, an icon, a window, a virtual keyboard, a word, a sign, a virtual console, a cursor, combinations thereof and the like for inputting one or more commands via touch, clicks, voice commands, eye orientation and the like.

Other objects, advantages and features of the present disclosure will become more apparent upon reading of the following non-restrictive description of illustrative embodiments thereof, given by way of example only with reference to the accompanying drawings.

BRIEF DESCRIPTION OF THE DRAWINGS

The following drawings form part of the present specification and present disclosure. In the appended drawings.

DETAILED DESCRIPTION OF ILLUSTRATIVE EMBODIMENTS

Figure 1:
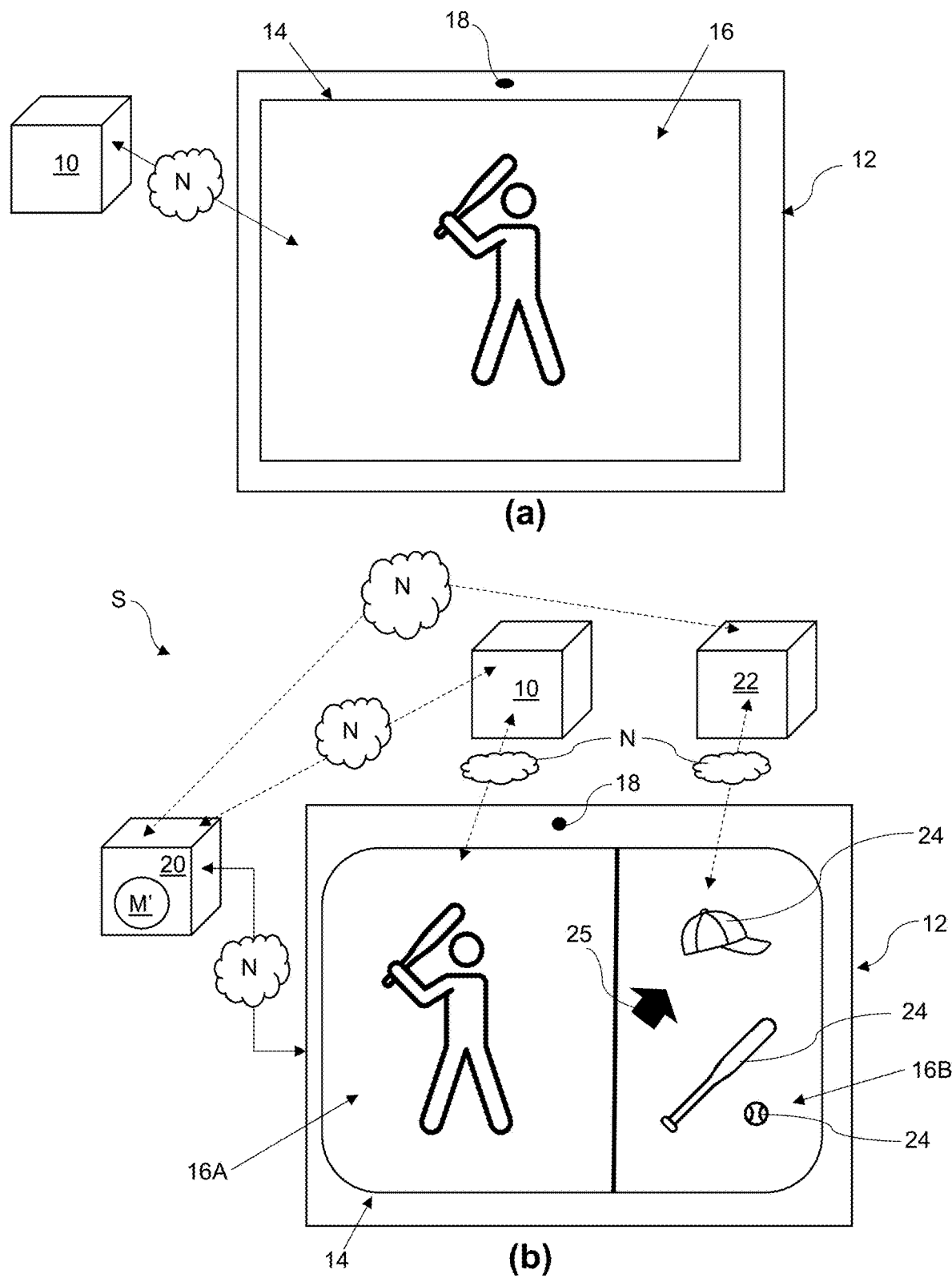
FIG. 1 is a schematic representation of a system for simultaneously displaying multiple graphical user interfaces via the same display showing a display running a user interface generated by a controller hosting a programme therefor in (a) and an interface system in (b) for simultaneously displaying multiple graphical user interfaces via the same display shown running the same graphical user interface in (a) via the same display in addition to simultaneously running another graphical user interface generated by the same or another controller hosting a programme therefor in accordance with a non-restrictive illustrative embodiment of the present disclosure.

Generally stated, there is provided a system for modulating a graphical user interface (GUI), the system comprising a user device comprising a device controller with an associated memory and a display interface for displaying the GUI. The GUI defines a frame boundary thereof further defining a GUI size, the GUI comprising content displayed via the display interface. A system controller is in communication with the user device. The system controller has a processor with an associated memory of processor executable code for being executed by the system controller or for being downloaded into the memory of the user device controller to be executed thereby or to be executed synergistically by a combination of the system controller and the device controller. Execution of the processor executable code by the system controller or by the device controller or by the combination thereof synergistically provides for the system controller or the device controller or the combination thereof with performing computer-implementable steps. The computer implementable steps comprise: splitting the GUI into two or more sub-GUI portions positioned within the GUI frame boundary; and providing for the two or more sub-GUI portions to simultaneously display respective content stored within the user device and/or hosted by the system controller and/or a same or different remote host controllers in communication with the user device.

In an embodiment, the computer-implementable steps comprise: detecting a real-time status selected from the group consisting of a device user status, a device status, an auxiliary device status, a content status, and a combination thereof; determining the detected real-time status based on status criteria stored within the memory of the system controller and/or the user device; modulating the GUI and/or the two or more sub-GUI portions on the basis of the determined real-time status.

In an embodiment, the step of modulating comprises a step selected from the group consisting of: splitting the GUI into the two or more sub-GUI portions positioned within the GUI frame boundary; resizing at least one of the two or more sub-GUI portions; reconfiguring at least one of the two or more sub-GUI portions; removing at least one of the two or more sub-GUI portions; reand modulating the displayed content; and a combination thereof.

Generally stated and in accordance with an aspect of the present disclosure, there is provided a system for simultaneously displaying multiple graphical user interfaces via the same display. The multiple graphical user interfaces are hosted by one or more remote host controllers. A user device is in operative communication with the one or more remote host controllers and comprises an interface display for displaying one or more of the multiple graphical user interfaces. A system controller is in operative communication with the user display device. The system controller has a processor with an associated memory of processor executable code that when executed provides the controller with performing computer-implementable steps comprising separating the interface display in two or more interface display portions and selectively providing for two or more of the graphical user interfaces to be simultaneously displayed via respective ones of the two or more interface display portions.

With reference to FIG. 1, there is shown in (a) a remote server 10 hosting a program that is being run on a user device 12 via a network N communication. The user device 12 comprises an integrated device controller (not shown), a device interface in the form of a display screen 14 for displaying a user interface 16 and an image capturing device 18. In (b), there is shown a system S for for simultaneously displaying multiple user interfaces via the same display. The system S comprises a controller 20 in a network N communication with device 12. The controller 20 has an associated memory M' of controller executable code that when executed provides for performing the computer implementable step of separating or splitting the user interface 16 into at least two interface portions or sub-interfaces 16A and 16B. Indeed, the screen 14 continues to run or display the program of host server 10 (in interface portion 16A) but in tandem it also runs a program from another host server 22 (in interface portion 16B). Of course, the programs producing the visual displays in interface portions 16A or 16B may be from the same host server (10 or 22, for example). In an example, interface portion 16A shows a sporting event while interface portion 16B juxtaposed to sub-interface 16A provides for advertising articles 24. Indeed articles 24 may be input images as described in U.S. Ser. No. 17/443,563 and can be operated by touch commands, cursor clicks, eye orientations (e.g., ¢) as described in U.S. Ser. No. 17/443, 563, voice commands and combinations thereof.

In an embodiment, the controller 20 provides for the user device 12 to access both programs from both hosts 10 and 22 (or a single host or multiple host as can be contemplated by the skilled artisan) or the controller 20 communicates via a network N with these hosts 10 and 22 to receive their program data and to recommunicate this data to the device 12 in a single visual display on the same screen 14 separated or split in portions to run both programs simultaneously.

Thus, the controller 20 (i.e. a server, cloud server or network of servers or data center and the like) of the system S provides by computer implementable steps to run two different programs on the user device 12 (e.g. handheld tablet) via the controller thereof, in order to display two different and unrelated interfaces or sub-interfaces or interface portions 16A and 16B. The controller 20 can return to one of the two or more juxtaposed interfaces and hence run one program. Thus, the controller 20 provides for advertising in tandem or providing options to the user for advertisements or provide options to the user to watch another simultaneous event or view highlights of that simultaneous event and so one and so forth.

In an embodiment, the system S provides for the user to choose to run more than one program on their display device screen 14. Thus, the controller 20 separates the interface 16 is portions 16A and 16B based on an X, Y cartesian table of pixels, where a portion of the pixels will display one program and another portion of the pixels will display another program.

Figure 2:
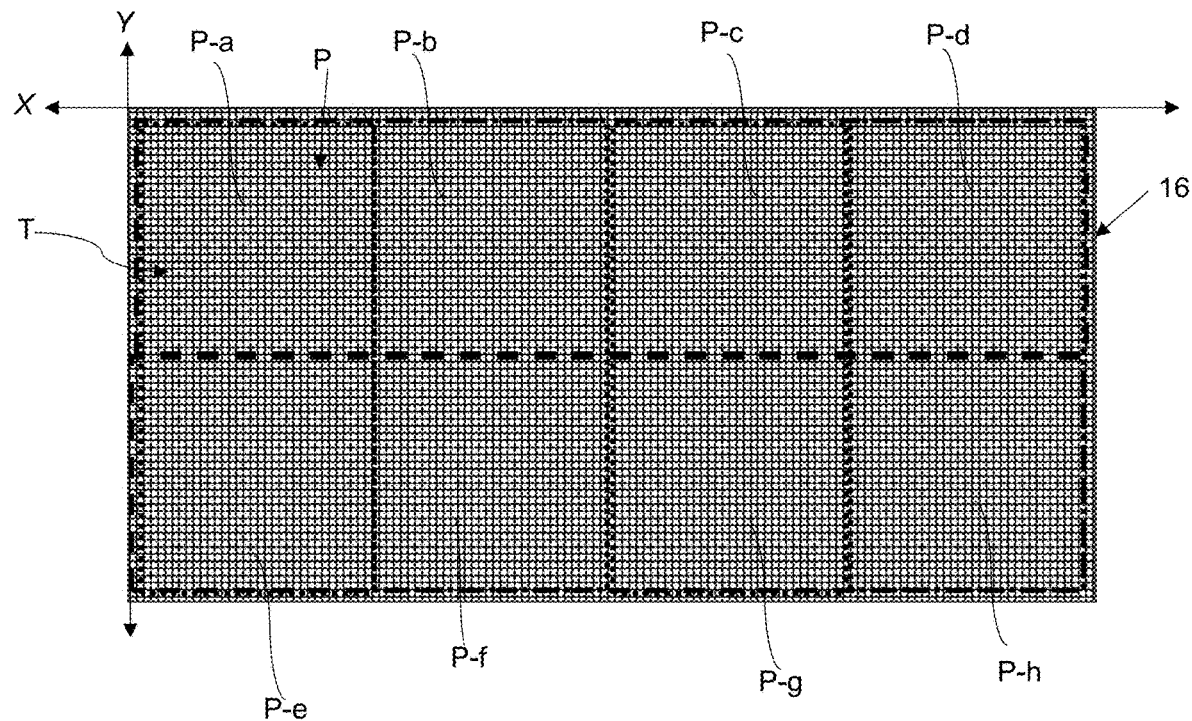
FIG. 2 is a schematic representation of computer generated cartesian table of a displayed graphical user interface of the present system with one more computer-generated interface display portions of the graphical user interface in accordance with a non-restrictive illustrative embodiment of the present disclosure.

Turning now to FIG. 2, the system S and method herein provide by way of the computer-implemented steps for generating a cartesian table T of a display screen 14 for displaying a graphical user interface 16. The cartesian table T includes a vertical Y axis and a horizontal X axis defining a plurality of given coordinates $(X_n, Y_n)$ for each given pixel P. Thus, the controller provides for separating a graphical user interface into interface portions thereof such as portions P-a, P-b, P-c, P-d, P-e, P-f, P-g, P-h. A given portion P-a contains pixels P within coordinates (Xa', Ya') to (Xa" Ya"). As such, the system and method by way of the computer implementable steps determine which display screen portions (P-a to P-h) will display a given program. Therefore, the system and method herein provide for a graphical user interface 16 to display a given program in a given one or given ones of these portions from one or more host servers as previously explained.

Of course, the interface 16 may be separated in any number of portions as is visually and usefully convenient. The size of the portions may be modulated by the controller 20, the user, the program hosts and combinations thereof. Thus, any convenient ratio can be used for screen splitting. Moreover, the screen can be split vertically as shown in (b) of FIG. 1 or horizontally. The foregoing may be modulated by the controller 20, the user, the program hosts and combinations thereof.

As such, in one example, a user can enjoy a sporting event or other online streaming product and can simultaneously view advertising without interruption of their main entertainment as two interfaces are being simultaneously run by the system S. The user can also purchase products in tandem via an input image as described in U.S. Ser. No. 17/443,563. Indeed, the double interface shown in (b) of FIG. 1 may also include a command input image as described in U.S. Ser. No. 17/443,563 such as a cursor 25 that moves with the field of view orientation φ as described in U.S. Ser. No. 17/443,563 to move across both sub-interfaces 16A and 16B so that the user can input commands via the cursor by clicking, voice commands and the like. The input image may include other command input applications and not be a cursor but an icon or window for receiving one more input commands.

In an embodiment, the systems herein provide for users to open an application in order to access the systems and methods herein, as such, in one example, the user opens the system application which identifies the user via visual recognition (face, eyes, iris), or touch recognition, or fingerprint recognition, or via voice command or a security password or any combination thereof. As such, the application provides for accessing one or more of the operating systems herein, such as the ability to modulate and/or operate input images via eye orientation φ as described in U.S. Ser. No. 17/443,563, the ability for the system to split the user interface and display two or more programs in tandem, the ability for the user to move an input image (such as a cursor, or a game console image) along one interface or a plurality of juxtaposed interfaces or interface portions or sub-interfaces via the same display screen including selectively rendering the command input image visible or invisible by user input commands or by predetermined computer-implementable steps.

Figure 3:
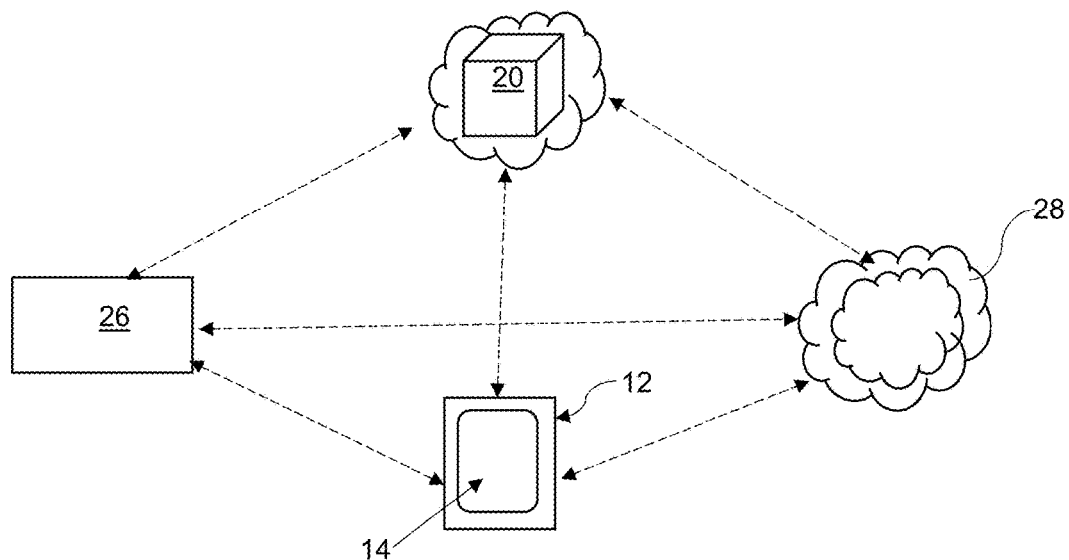
FIG. 3 is a schematic a system for simultaneously displaying multiple graphical user interfaces via the same display in accordance with a non-restrictive illustrative embodiment of the present disclosure.

FIG. 3 shows the system S comprising the controller 20 such as a cloud server, in remote operative communication with the user display device 12. There is also shown a data center 26 and a content delivery network (CND) 28. Various operative communications can be provided within the communication architecture of system S.

The controller 20 can be in remote operative communication with the data center 26 and/or the CDN 28. The data center 26 and the CDN 28 can be in remote operative communication. The data center 26 and/or the CDN 28 can be in remote operative communication with the user device 12. In this way, the controller 20 can modulate the graphical user interface 16 of the user device 12 by receiving the content for display from the data center 26 and/or the CDN 28 directly and modulating the content at the controller level in order to transmit the content to the user device 12 for display in the modulated format. It is understood that the modulation referred to herein refers to the selective separating/splitting (or resizing) of the graphical user interface 16 as provided herein.

In an embodiment, the user device 12 receives content directly from the data center 26 and CDN 28 and the displayed content is modulated by the controller 20 at the device 12 level for simultaneous display as provided herein. In an embodiment, the user device 12 communicates with the data center 26 and/or the CDN 28 directly to access content for display. In another embodiment, the user device 12 communicates with the data center 26 and/or the CDN 28 via the controller 20 to access content for display.

Figure 4:
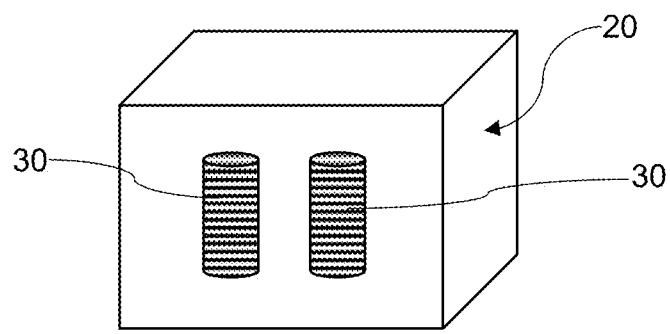
FIG. 4 is a schematic representation of the controller of the system for simultaneously displaying multiple graphical user interfaces via the same display in accordance with a non-restrictive illustrative embodiment of the present disclosure.

As shown in FIG. 4, the controller 20 comprises a user profile 30 for each system user. A user can access the system S by logging into the controller 20 via an identification code for example or other identification as described above. In an embodiment, the user profile 30 provides for registering content streaming preferences as will be further discussed herein. The user profiles 30 are stored within the memory M of the controller such as within a database thereof.

Figure 5:
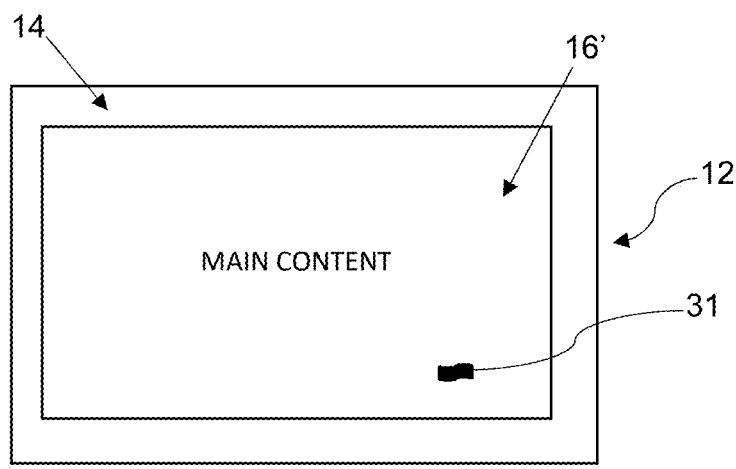
FIG. 5 shows a display device with a screen displaying a graphical user interface displaying main content, the display device being in operative communication with the system controller in accordance with a non-restrictive illustrative embodiment of the present disclosure.

In an embodiment shown in FIG. 5, the user views main content on via their screen 14 via graphical user interface 16'.

Figure 6:
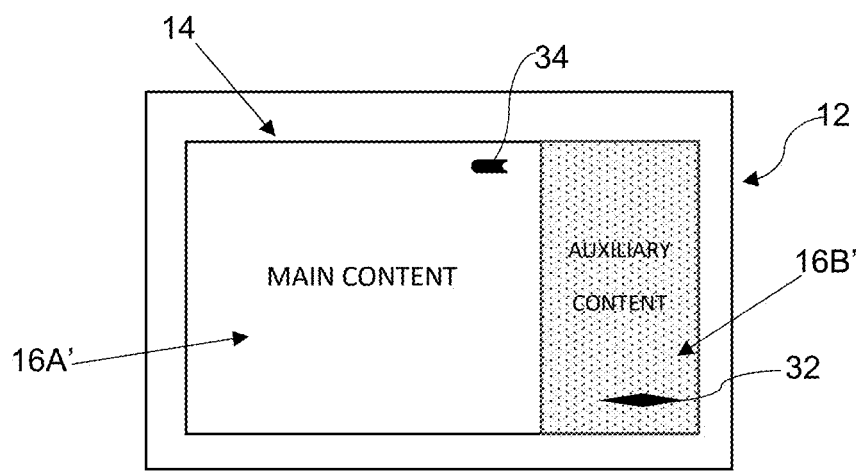
FIG. 6 shows the display device of FIG. 5 with the graphical user interface having been separated by the controller to provide for two interface portions for simultaneously displaying via the screen the main content in addition to auxiliary content in accordance with a non-restrictive illustrative embodiment of the present disclosure.

As shown in FIG. 6, the screen 14 is "split" or "resized" in that the graphical user interface 16' is divided (or separated) into a main portion 16A' and an auxiliary portion 16B' respectively and simultaneously displaying independent main and auxiliary content. This "screen splitting" can be selectively modulated by the controller 20 or requested by the user. For example, if the main content happens to be a commercial, the user can click on the interface 16' and this will resize or split the interface 16' into a main portion 16A' running the main content that was running on the interface 16' without interruption while generating an auxiliary portion 16B' which provides, for example, purchasing information related to the product in the commercial (main content). In another example, the controller 20 interface 16' generates a temporary input command image 31 (see FIG. 5) that disappears after a time frame if no input is provided. The input image 31 can indicate the type of auxiliary content the controller 20 can stream in an auxiliary screen portion. If the user inputs a command via touch, click, voice and the like the interface 16' is split or resized to show a main portion 16A' running the main content of interface 16' without interruption and an auxiliary portion 16B' streaming the auxiliary content.

In an embodiment, the auxiliary portion 16B' advertises a product that can be associated with the main content. For example, controller 20 executes the computer-implementable step of identifying articles (such as 24 in FIG. 1) within the main content provided by a host sever 10 (see FIG. 1) or the data center 26 (see FIG. 3) and accessing the auxiliary content via one or more other host server 22 (as in FIG. 1) or the CDN 28 (FIG. 3). In one example, a character in a movie (main content) has been wearing a cap or has been fishing or is eating pasta, the controller 20 provides for the server 22 or CDN 28 to communicate an advertisement (auxiliary content) in the auxiliary portion 16B' related to caps, fishing, and/or pasta. Thus, advertisements in the auxiliary content can be related to elements (products, actions, scenarios) in the main content. Furthermore, the information in the user profile 30 provides the controller 20 with the computer implementable step of evaluating advertised content provided by the a sever 22 or a CDN 28 that fits the user's interests as evaluated by their streaming behavior (i.e. content that they stream, e.g. types of products, brands, activities) or that they have indicated in their user profile 30 as being of interest. Thus, the auxiliary content is tailored to suit the user via streaming behavior or user profile 30 information.

The information in the user profile 30 can be collected via a system S provided questionnaire in order to prompt the user to indicate their interests and preferences or by direct inputs from the user without prompting. The user profile 30 can also be modulated by clustering user profiles 30 that are similar based on geography, age group, gender and other socio-economic and cultural parameters, to create clusters of interests. The auxiliary content that would be advertised can be based on these clusters of interest, i.e. a given user belongs to a given cluster of interests and thus auxiliary content of interest will be shown that may also be related to the currently streamed main content thereby optimizing interest of a given user for a given advertisement. Indeed, various algorithms for advertising to content users are already used in social media and similar ones can be used in system S.

In an embodiment, the auxiliary portion 16B' comprises input command images 32. Input, can be provided by touch, clicks, voice and the like. In an embodiment, a user the user to "like" the content and thus register this information to the user profile 30. In an embodiment, the touch or clickable commands 32 provide for the user to close the auxiliary portion 16B' and return to the main content "resizing" the screen 14 in that only that the main portion 16A' returns the full size of the interface 16' (as in FIG. 5). In an embodiment, the input for returning to the main content can be provided by input command images 34 in the main portion 16A'.

In an embodiment, the input command images 32 provide for the user to access more information related to the advertised product and move towards a purchase page or a checkout all within the auxiliary portion 16B' being simultaneously displayed along with the main content in the main portion 16A'.

Figure 7:
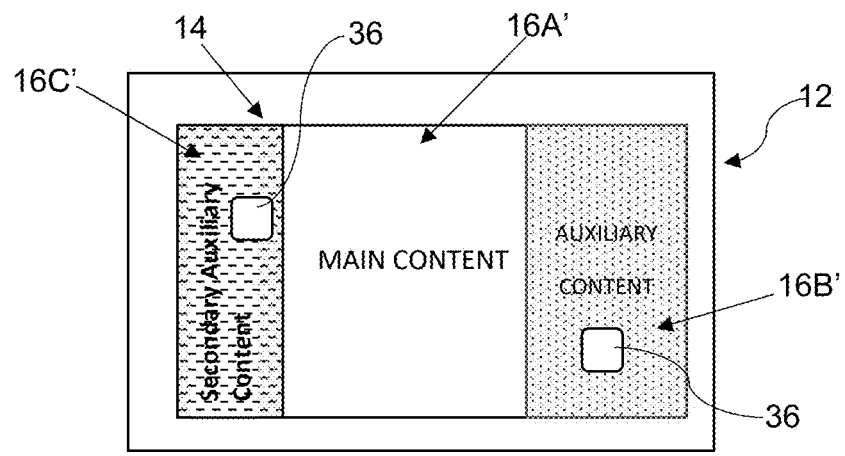
FIG. 7 shows the display device of FIG. 5 with the graphical user interface having been separated by the controller to provide for three interface portions for simultaneously displaying via the screen the main content in addition to auxiliary content as well as secondary auxiliary content in accordance with a non-restrictive illustrative embodiment of the present disclosure.

In an embodiment, as shown in FIG. 7, a secondary auxiliary portion 16C' is provided in which the user can view secondary auxiliary content. For example, the secondary auxiliary content may provide purchase information related to the product advertised in the auxiliary content displayed via the auxiliary portion 16B'. In an embodiment, the auxiliary portion 16B' or the secondary auxiliary portion 16C' provide for communicating with the merchant via a communications window 36 for example, to receive merchant information related to the advertised content. The secondary auxiliary portion 16C' can be generated by the user clicking on the auxiliary portion 16B' or by the user inputting a command therefor via the input command image 32.

In an embodiment, the auxiliary content does not include sound and thus, there is no interruption of the main content sound. In an embodiment, the auxiliary content includes sound and when the system S runs auxiliary content, the sound of the main content is muted, and the user can only experience the main content visually as the only sound emitted is that of the auxiliary content.

Figure 8:
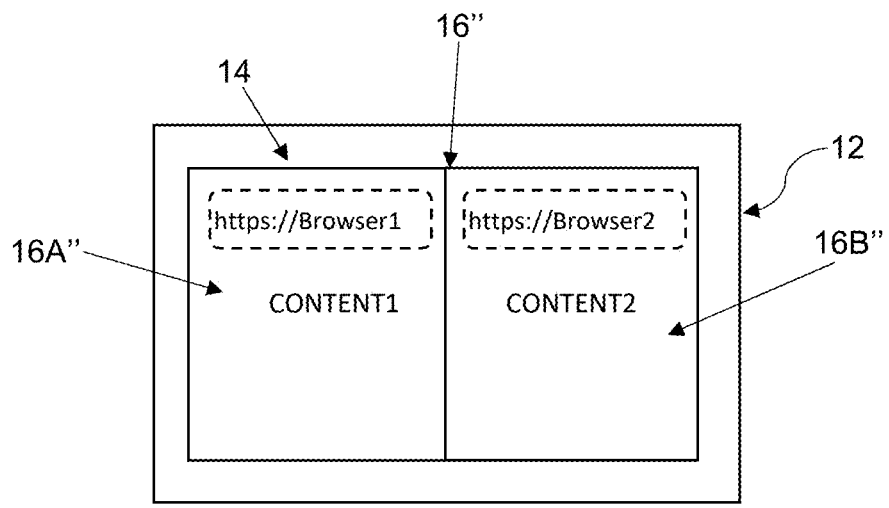
FIG. 8 shows a display device with a screen in operative communication with the system controller simultaneously displaying two browser pages in respective interface portions via the same screen in accordance with a non-restrictive illustrative embodiment of the present disclosure.

In an embodiment, shown in FIG. 8, an interface 16" is split into two independent sub-interfaces 16A" and 16B" allowing for running two independent browsers simultaneously or two different apps simultaneously. In this case, there is no main content per se, there is simply multiple content on respective portions. Of course, more portions can be provided with more browsers and/or applications. In an embodiment, the one of the sub-interfaces runs a browser and another an app.

In an embodiment, when viewing main content on an interface 16', the user can choose to share this main content, and this split the screen to produce a main interface portion 16A' showing the main content without interruption and an auxiliary interface portion 16B' providing an input page to enter email, phone number, name or other contact information so as to share the main content with one or more contacts. This information can be entered by keyboard inputs, by selecting a name in a contact list or by voice command. Thus, in an embodiment, the user profile 30 contains or has access to a user contact list.

The user can click on the interface 16' and input command images 31 can be generated with various possible auxiliary content such as an advertisement page, a browser page or a share page and the like.

In an embodiment, the auxiliary content is a social media page and the main content is shared in the social media page by dragging and dropping or simply by a click or other like commands including voice commands, touch commands or social media page commands. Indeed, the user can simultaneously view main content and participate in a social media network in the auxiliary content part of their screen commenting on the main content which can be media, a movie, a sporting event, news events, a video game and other accessible content.

In an embodiment, when sharing content as provided herein, the controller 20 may have the user profile 30 of the individual the content is being sent to and thus in the case where this user is viewing main content on their interface 16', the controller 20 can inform the user via a visual or audial cue or via an input command image 31 that a sender wishes to share content. Thus, the receiving individual can request a screen split or resizing (i.e. interface separating) with their main content continuing to be displayed via an interface portion 16A' and the shared content being shown via the auxiliary portion 16B'.

In an embodiment, when the main content is a commercial or infomercial and the user wishes to purchase a given product advertised in the main content, user input commands provide for auxiliary content to be simultaneously displayed in the split screen or resized interface mode provided herein in order to run an online shopping page where the advertised product or products can be purchased.

Figure 9:
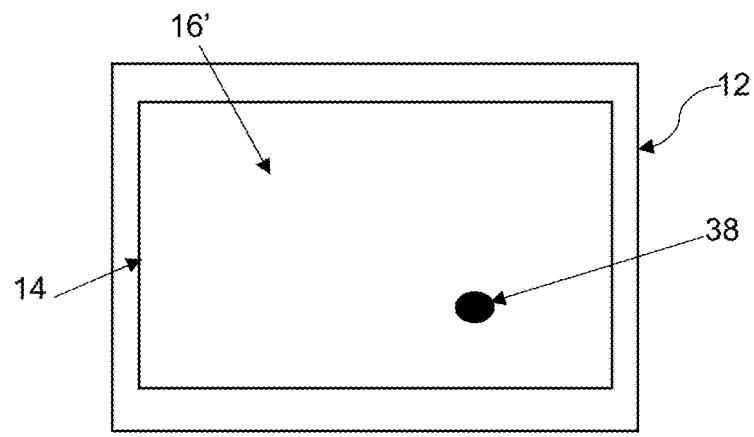
FIG. 9 shows a display device with a screen in operative communication with the system controller displaying in a graphical user interface an input command image in accordance with a non-restrictive illustrative embodiment of the present disclosure.
Figure 10:
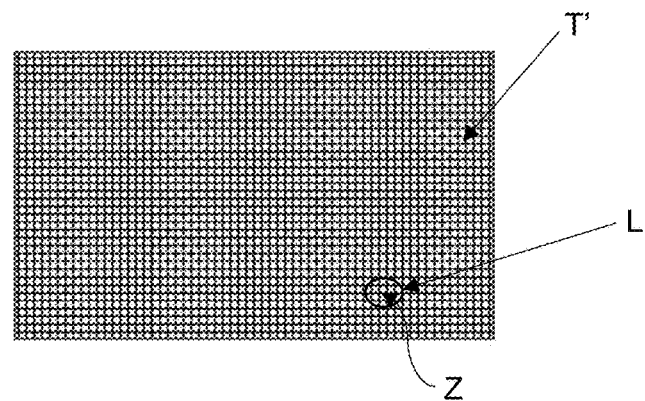
FIG. 10 is a computer generated cartesian table of pixels of the graphical user interface of FIG. 9 showing the position in the cartesian table of the input command image and the pixel zone covered thereby in accordance with a non-restrictive illustrative embodiment of the present disclosure.

In an embodiment and with reference to FIGS. 9 and 10, the main content running on the interface 16' includes integrated input command images 38 as described in U.S. Ser. No. 17/443,563 that correspond to the location L within the cartesian table T' corresponding to the interface 16' of input command images 38. The input command images can be articles for example shoes worn by soccer players or helmets worn by hockey players or foods being eaten by actors, or computers in a news program and the like. Therefore, when a user sees an article of interest, they click on this article that corresponds to an input command image 38 (i.e. acts an input command image described in U.S. Ser. No. 17/443,563) and the interface 16' is separated, resized or split to allow auxiliary content related to the article of interest to be displayed in the auxiliary portion 16B' while the main content continues to be simultaneously displayed via the main portion 16A'. Thus, the controller 20 executes the computer implementable step of identifying pixel zones Z within the cartesian table T' which correspond to articles of interest in the main content and thus provides for the pixel zones Z which are changing in real time as the position of the article of interest changes in real time within a streamed scene of the main content. Thus, the user clicks on the article of interest or touches the screen 14 at a position corresponding to the position of the article of interest thereby clicking on or touching the pixel zone Z corresponding to the article of interest and as such inputting the command to simultaneously display auxiliary content related to the article of interest as explained above.

Figure 11:
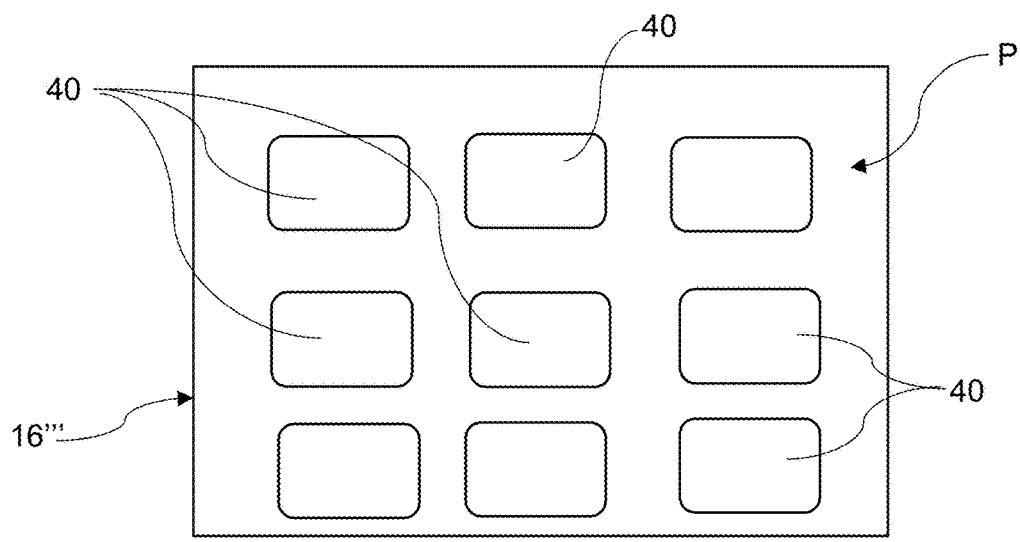
FIG. 11 shows a system platform interface for streaming and uploading video content in accordance with a non-restrictive illustrative embodiment of the present disclosure.
Figure 12:
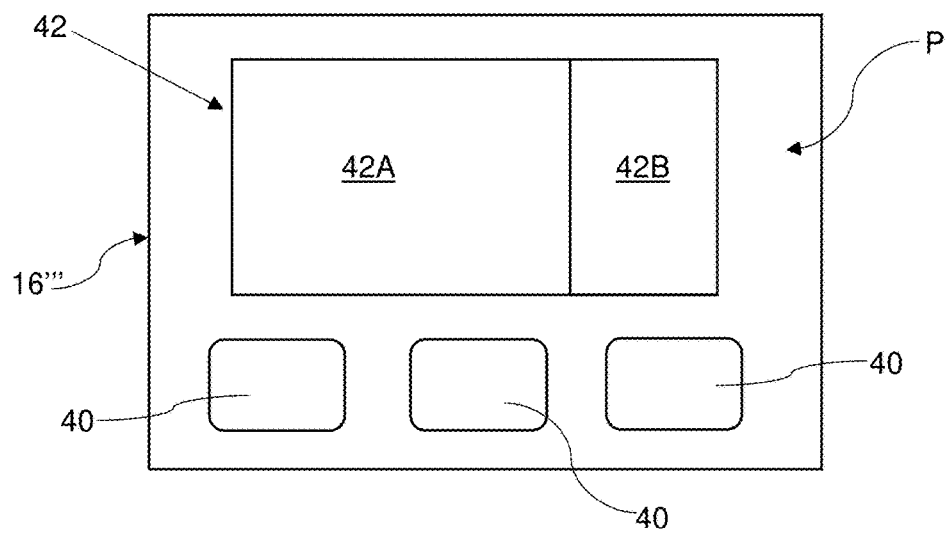
FIG. 12 shows the platform of FIG. 8 with selected video content being streamed in a platform interface display being separated in display portions respectively and simultaneously displaying main and auxiliary content in accordance with a non-restrictive illustrative embodiment of the present disclosure.

In an embodiment, and with reference to FIGS. 11 and 12, the system S provides a platform P for users to upload their video content 40 to be viewed by users of the platform P. Thus, the platform P provides a main interface 16''' with various video content 40 for being viewed by platform users. When a user selects a given video 40 for viewing, a video interface 42 opens within the main interface 16''' as shown in FIG. 12 in order to stream the main content. At a predetermined point during streaming of the main content, the controller 20 splits the interface 42 into a main portion 42A which continues to stream the main content without interruption and an auxiliary portion 42B which displays auxiliary content such as advertising and then removes the auxiliary content to resize the interface 42 back to its original size. The user can choose via an input command as provided herein to access information in the auxiliary portion 42B or to move to a check out command section where they can purchase the produce being advertised and in this case, the controller 20 registers this action and the user who uploaded the video content that lead to the purchase is compensated via points or financially by way of a percentage on sales generated and the like.

In an embodiment, the platform P allows advertisers who wish to advertise when video content 40 is being streamed as provided herein to modulate their advertisement such that it is clickable in that an click input command will lead to a shopping interface (for example) within the auxiliary portion 42B. In another embodiment, a user who uploads video content can modulate the type of advertisement that can be displayed in the auxiliary portion 42B, for example they may request that certain products not be advertised (alcohol, meat, etc.) or that the advertisements are not clickable and are only provided as information. The foregoing information is pre-stored within the user profiles 30. In an embodiment, an advertisement may include a code for the viewer and the viewer may then shop on another platform using the code. The code may be used to provide a rebate to the shopper or a reward to the content provider.

Examples of configurations in screens, content can be changed from one sub-interface to another, different resizing or splitting shapes, user can select which ones they like when viewing, the resizing can be done based on user's device screen. The user can modulate and put this in profile.

In an embodiment, the step of separating the interface into interface portion comprises the controller 20 providing the device 12 with an application to be stored thereon that allows for user inputs prompted and or unprompted to separate in an interface into portions thereof simultaneous display of separate content. The application communicates with the controller 20 via the device 12 which knows that a split has occurred and can allow additional content to be shown on the additional interface portion or portions as provided herein. Thus, in this case it is not the controller 20 that separates the interface but an application stored on the device 12 provided by the controller 20 and in communication therewith.

The controller 20 is in communication with the device 12 and detects the size, shape and configuration of the screen as well as the pixels in the cartesian table T or T' thereof in order to resize the screen in a suitable split screen mode or coni Different types of splits will be required for different types of screens depending on the device being used. For example, a smartphone, a tablet, a laptop, a smart TV have different screen sizes and different pixel definitions, and this requires different screen split configurations.

Turning to FIGS. 13A, 13B, 13C, 13D, 13E and 13F, there are shown non-limiting examples of separated interfaces 16i, 16ii, 16iii, 16iv, 16v, and 16vi respectively. In this example, interface 16i is separated in a square interface portion 16i-a and an L-shaped portion 16i-b. Interface 16ii is separated horizontally and vertically with four portions 16ii-a, 16ii-b, 16ii-c, and 16ii-d. Interface 16iii is separated horizontally with a top larger portion 16iii-a and a bottom narrower portion 16iii-b. interface 16iv is separated vertically with main a portion 16iv-a and an auxiliary portion 16iv-b and is also separated horizontally providing a secondary auxiliary portion 16iv-c. Interface 16v is separated vertically and horizontally in four equal square portions 16v-a, 16v-b, 16v-c and 16v-d. Interface 16vi is separated horizontally with a top portion 16vi-a, a bottom portion 16vi-b, and two vertically separated median portions 16vi-c and 16vi-d.

Of course, still other configurations with more or less portions can also be provided as will be readily understood by the skilled artisan.

Moreover, the user can switch the content displayed in the various portions in other words content shown in one given portion can be shown in another an vice versa with an input command that is communicated to the controller 20 or that is provided by the application stored on the device 12 as previously explained. The user can also select a preferred split mode configuration. The controller 20 can provide the user with a selection of interface divided configurations and the user's choices are registered in their profile 30 so that interface separation for a given user is based on the user's preferences.

In an embodiment, the add blocker of a user's device 12 will not block auxiliary content (if it is desired) on the auxiliary portion. In this case, a host server (10 or 22 in FIG. 1 for example) sends its content to the user device 12 via the controller 20 which allows the content to be shown in the auxiliary interface portion bypassing the add blocker as it is the controller 20 that is sending the content to the user device 12 and not the host server (such as 10 or 22). Of course, in an embodiment, this is configurable by the user and can be registered in their profile 30.

In an embodiment, system users can download or stream a video game from a server including the controller 20 or another host server 10 or 22, or the data center 26 or the CDN 28 etc. In any event, the controller 20 is in remote and operative communication with the user's device 10. During game play, the controller 20 can execute the computer implementable step of separating or splitting the screen interface display as provided herein to run an advertisement in an auxiliary interface portion as provided herein. The controller 20 can also stop the game thereby pausing the current play to run auxiliary content in the auxiliary interface portion but the user's device remains connected with the server through the network so that server can split the user's device screen or stop the video game during playing of the video game to run ads.

In an embodiment, is a user does not have a high-speed internet connection and requires same in order to download a game for example, the controller 20 will execute the computer implementable step of connecting with a high-speed internet connection to compensate for the user's connection. This can be done automatically by the controller 20 or upon an input command request for the user. Thus the system S provides a high-speed internet connection to the user's device 12 (PC, tablet, smartphone, erc.) via the controller 20 or via another host server as provided herein to allow the user to download the game on their device 12 and play later on when download is complete.

In an embodiment, the controller 20 connects with another host server to which provides a high-speed internet connection, and a video game or other content is streamed in the user's device 12. Thus, If the user does not have a high-speed internet connection and they are connected to the host server 10, the controller 20 will download the game in its database and stream it through the user's device 12 thereby avoiding the lag time due to the internet connection. The controller 20 automatically connects with a high-speed internet connection providing the game to be played on the device 12.

When a user's device 12 connects with the controller 20, the controller performs the computer implementable step of detecting the user's device 12 details like IP, MAC address, program viewing, size of screen, resolution of screen, pixels, model, manufacturer, location and the user via their profile 30 once registered including preferences as provided herein.

In an embodiment, when a user uploads content unto the platform P or the controller 20 or another host server 10, 22 or data center 26 through the controller 20, the controller 20 register's in the user's profile 30, the location of where the content originated from on a virtual map within the memory M. Thus, when another user searches for local content the controller 20 can provide the searching user with local content. This may be convenient for receiving local advertisements for example. Local can mean within the same area of a city, the same city, countey, state or province or other geographical proximity that can be modulated by the searching user via input commands that can be registered in their preferences within their user profile 30. In an embodiment, when user uploads content as provided herein, their location is registered by the controller 20 and the location of the searching user is also registered by the controller 20 which can provide local search results by way of predetermined geographical proximity thresholds.

In an embodiment, an uploading user can choose another territory as their content location rather than their physical territory.

In an embodiment, a searching user can choose another territory as their search location rather than their physical territory.

Figure 14:
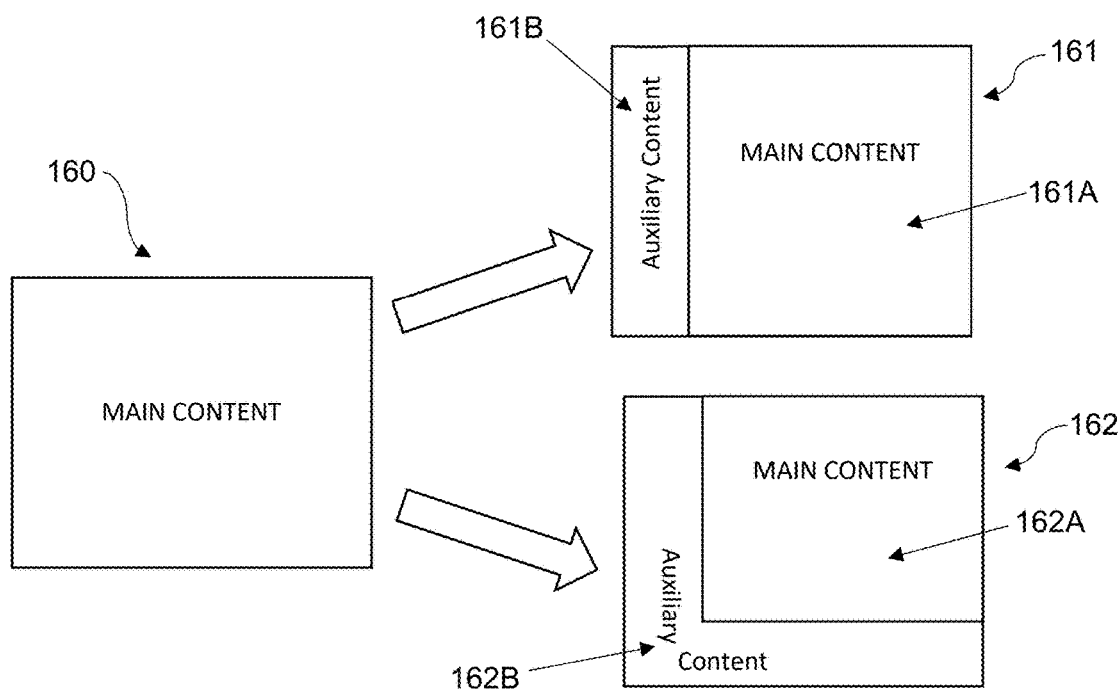
FIG. 14 is a schematic representation of an interface display displaying main content being separated into two different possible separated interface configurations for simultaneously displaying main content in a main interface display portion and auxiliary content in an auxiliary display portion in accordance with a non-restrictive illustrative embodiment of the present disclosure.

Turning now to FIG. 14, there is shown a graphical user interface 160 that the controller 20 can separate into a first separated mode configuration 161 or a second separated mode configuration 162 for example. In configuration 161, the main content shown in interface 160 is being displayed in main interface portion 161A and auxiliary content is being displayed in the auxiliary left band portion 161B.

In configuration 162, the main content is being displayed in main interface portion 162A and the auxiliary content is being displayed in auxiliary L band portion 162B. The controller 20 provides for advertisements to be streamed in the auxiliary portions 161B or 162B while the main content of interface 160 is shown in its entirety without being covered by bands but simply being resized into interface portions 161A or 161B. This way, an advertisement can be simultaneously streamed with the main content being streamed without interruption or blockage (as it is re-sized). In an embodiment, the advertisements of the auxiliary content have no sound and enjoyment of the main content is not compromised.

Therefore, in essence, the controller ingests an advertisement into the streaming video and thus provides interface modes 161 or 162 for example for simultaneous streaming.

In an embodiment, the controller 20 is in communication with an advertisement server that wishes to stream advertisements as user's enjoy other content and rather than stopping the main content or covering it with an ad, the controller ingests it into a single frame (161 or 162) for simultaneous streaming.

Thus, the controller 20 performs the computer implementable step of blocking the main content from being stopped. The controller 20 identifies the advertisement content that is to run during streaming of a video as is in communication with the ad server and has identified the advertisement time stamp prior to the advertisement coming on and consequently blocking the main content during advertisement. The controller 20 provides for ingesting the advertisement content and streaming it without sound in the separated interface mode configuration of two or more interface portions.

A graphical user interface or GUI is both the program being hosted on server for being displayed and the display itself. The terms interface and GUI are interchangeable. An interface portion or a GUI portion is a portion of the overall GUI being displayed through the same screen. Yet an interface portion is also a separate GUI unto itself. An interface display is the interface being displayed through a device display (e.g. screen). An interface display portion is a part of the over visual frame or interface that hosts a separate GUI. Each interface display portion displays its own GUI (i.e. content). The content can be a stream, a video, a video game, or another interactive GUI etc. In essence, the visual display of the screen is being split into separate displays with respective content that are independent from one another much like having multiple devices with respective screens. Yet, in this case multiple content can be viewed via the same screen. Separating, dividing, or splitting the screen/interface can also be referred to as resizing the screen/interface wherein the main content being shown in the full screen is resized to become smaller as to fit another one or more interface display portions with respective content for simultaneous display via the same screen. Resizing also includes enlarging a given interface display portion to the full size of the interface display provided by the screen while removing the other portions and thus the resized portion becomes the interface display displaying its own and the sole GUI rather than multiple GUIs. Of course, resizing also includes reducing the size of main content running in the full screen (interface display) to be displayed in a smaller portion of the display thus allowing for other interface display portions to simultaneously run other content.

Generally, a framework is a layered structure indicating what kind of programs can or should be built and how they would interrelate. GUIs are built on a framework. In an embodiment, the framework of the GUI is modulated (modified, changed, replaced etc.). In an example, the system controller 20 executes the computer implementable step of modulating the framework of the user interface 16. Indeed, the system controller 20 modifies the interface software framework running on the user device 12 (i.e., stored within the memory thereof). In an embodiment, the system controller 20 adds or changes the interface framework of the user device 12. The foregoing provides for simultaneously displaying more than one content streams. The foregoing is provided by splitting a media window in a GUI into two or more media sub-windows.

In an embodiment, the system controller 20 provides for the user device 12 to download an application in its memory providing the user via user input commands to split the screen as defined herein or splitting the GUI of a media window in a GUI. In an embodiment the system controller 20 provides for the user device 12 to download an application in its memory providing the user via user input commands to resize the GUI or portions thereof (following splitting) as provided herein. In an embodiment, the foregoing application is contained within another application. Thus when a user wishes to download a given app they concurrently download into their device the application allowing their device to displaying multiple graphical user interfaces via the same display as provided herein and to modulate the multiple graphical user interfaces as provided herein.

Figure 15:
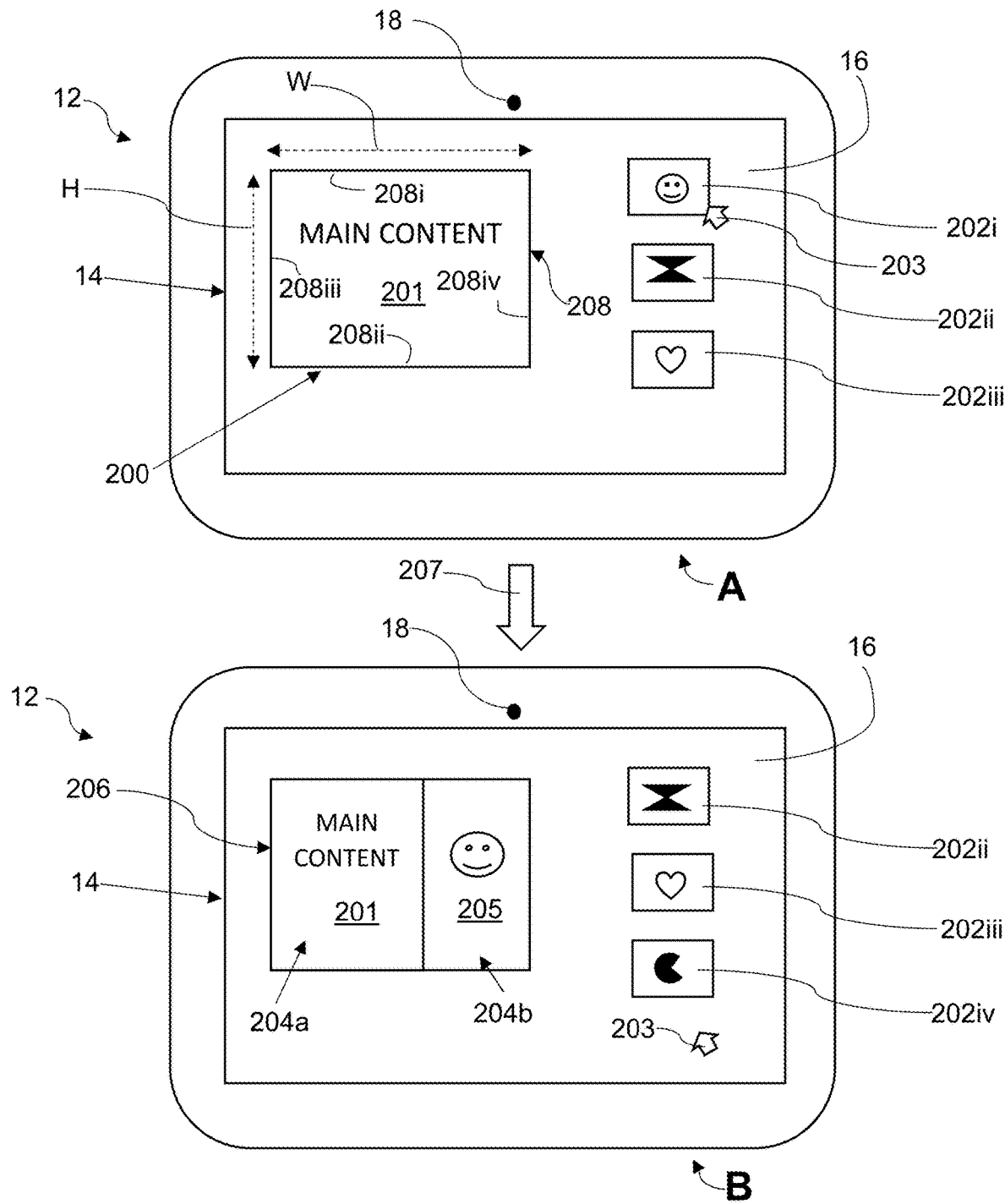
FIG. 15 is a schematic representation of a user device with a display interface including a host GUI including at A a media window displaying main content and thumbnail windows for displaying other content via the media window when selected, the media window being split into two sub-window portions at B with one sub-window portion displaying the main content and the other sub-window portion simultaneously displaying the additional or auxiliary content in accordance with a non-restrictive illustrative embodiment of the present disclosure.

As previously explained the media window is a GUI which can be positioned within a larger GUI (a host GUI). For example, and as shown in FIG. 15, a user device 12 has a display interface such as a display screen 14 with a user interface 16 or GUI displaying a video streaming website (i.e. the host GUI) for example including a media window 200 displaying currently streaming content (or main content 201) and thumbnails or icons 202*i*, 202*ii*, 202*iii* for selecting other content. The user can input a command (such as a click by a cursor 203 for example or by other input commands as explained herein) to one of the thumbnails or icons (e.g. 202*i*) to watch additional/auxiliary content 205 with the main content 201. Instead of the window 200 replacing the main content 201 streamed by the content 205 related to the selected thumbnail 202*i* (as is known in the art), the window 200 at A is split (separated/subdivided) at step 207 into two sub-windows 204*a* and 204*b* at B thereby forming together a multiple display window 206. One sub-window 204*a* continues to display the main content 201 and the other sub-window 204*b* concurrently displays the content 205 of icon 202*i*. Splitting can be done automatically via the system controller 20 or by way of a user input command or user event as will be further discussed below. The application for splitting can also be downloaded from the system controller 20 into the memory of the user device 12.

Figure 16:
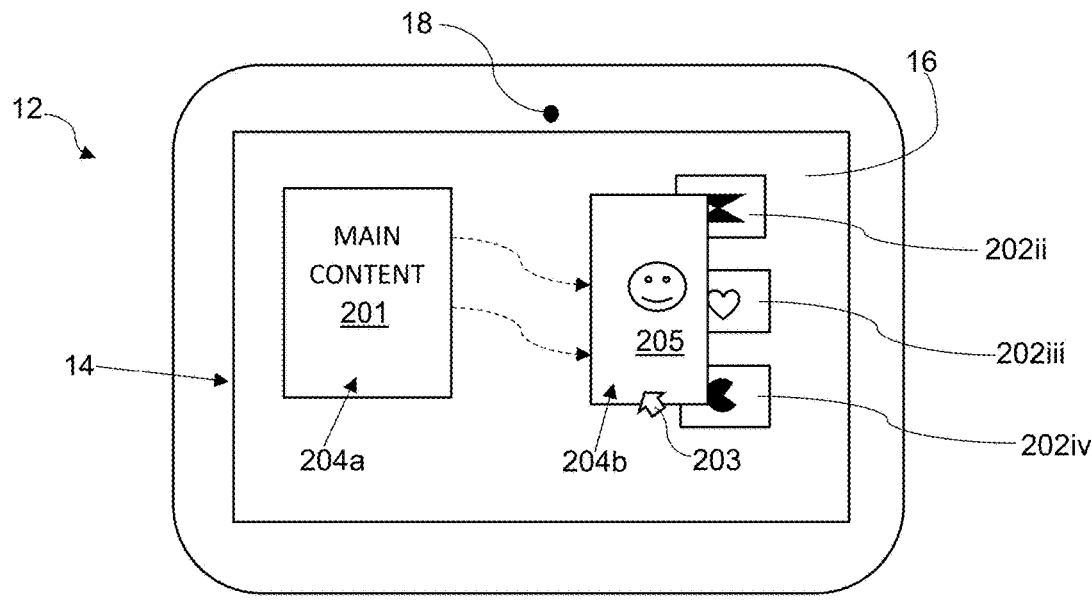
FIG. 16 is a schematic representation of the user device of FIG. 15 with one of the sub-window portions at B of FIG. 15 being undocked from the other one of the sub-window portions in accordance with a non-restrictive illustrative embodiment of the present disclosure.

Turning to FIG. 16, one of the sub-windows, for example 204*b* can be undocked (spatially removed) from the multiple display window 206 and moved along the GUI 16 to another position thereby becoming in essence an independent media window and consequently providing for sub-window 204*a* to also become an independent media window thereby dismantling/disassembling the multiple display window 206. As such, the GUIs 204*a* and 204*b* can be spatially separated from one another along the width and height span of the GUI 16. Indeed, the undocked independent media 204*b* is provided to overlap on the rest of the GUI 16 (including the thumbnails 202*ii*, 202*iii*, 202*iv*), which in this case is an example of a media streaming website as known in the art. Indeed, the GUIs 204*a* and 204*b* can be adjoined together or re-docked to again form the multiple display window 206 hence becoming sub portions thereof once again.

The system controller 20 provides for undocking the media window display 200 from its position on the media streaming website 16 and positioning it elsewhere on the GUI overlapping (i.e. covering) any contents thereunder as shown in the example of FIG. 16 where a media sub-window 204*b* covers the thumbnails 202*ii*, 202*iii*, 202*iv*.

The system controller 20 can provide the foregoing GUI modulation capabilities to the user device 12 via an application that is downloaded on the user device 12 providing the user to modulate media windows and sub-windows as provided herein via input commands therefor.

Turning back to FIG. 15, the media window 200 defines a height H and a width W. Indeed, the media window 200 usually has a rectangular configuration. The media window 200 comprises an outer frame 208 having a vertical top and bottom borderlines 208*i* and 208*ii* and lateral side borderlines 208*iii* and 208*iv*. When the media window 200 is split (separated/divided) to provide for sub-windows it transitions to the multiple display window 206 as shown in FIGS. 15 and 17 maintaining the same outer frame 208, height H and width W thereof.

Figure 17:
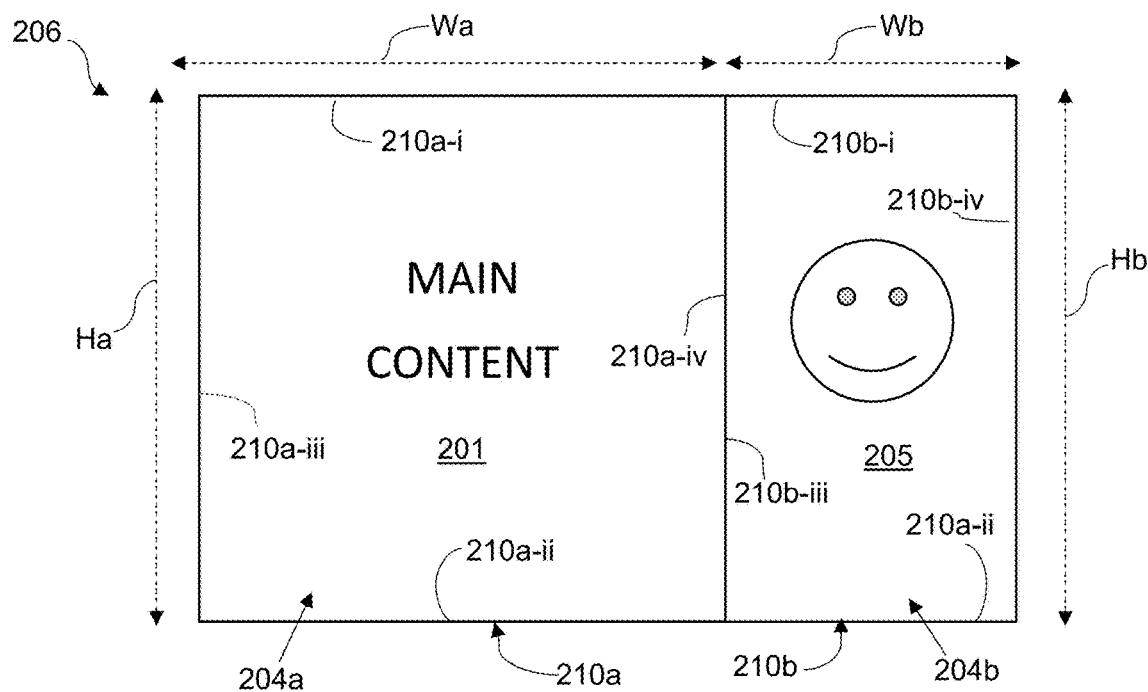
FIG. 17 is an enlarged view of the split GUI at B of FIG. 15 in accordance with a non-restrictive illustrative embodiment of the present disclosure.

With reference to FIG. 17, each sub-window 204*a* and 204*b* defines a respective height Ha and Hb and a respective width Wa and Wb. The media sub-windows 204*a* and 204*b* usually have a respective rectangular configuration. The media sub-windows 204*a* and 204*b* comprise respective outer frames 210*a* and 210*b* having respective vertical top borderlines, 210*a-i*, 210*b-i*, respective bottom borderlines 210*a-ii*, 210*b-ii*, respective first side borderlines 210*a-iii*, 210*b-iii* and respective second side borderlines 210*a-iv*, 210*b-iv*.

Figure 13A:
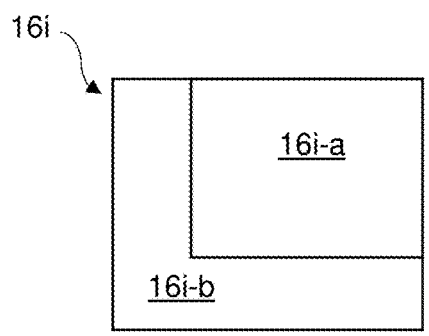
FIG. 13A shows a separated interface display configuration with two interface display portions thereof simultaneously displaying respective content in accordance with a non-restrictive illustrative embodiment of the present disclosure.
Figure 13B:
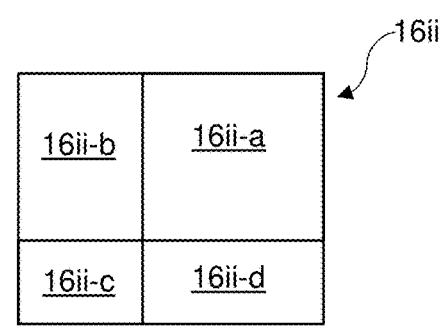
FIG. 13B shows a separated interface display configuration with two four display portions thereof simultaneously displaying respective content in accordance with a non-restrictive illustrative embodiment of the present disclosure.
Figure 13C:
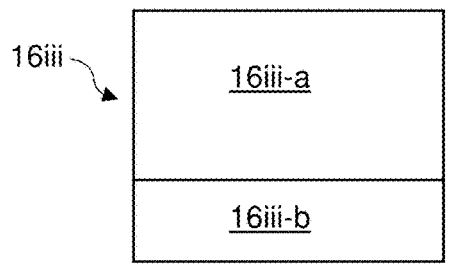
FIG. 13C shows a separated interface display configuration with two interface display portions thereof simultaneously displaying respective content in accordance with a non-restrictive illustrative embodiment of the present disclosure.
Figure 13D:
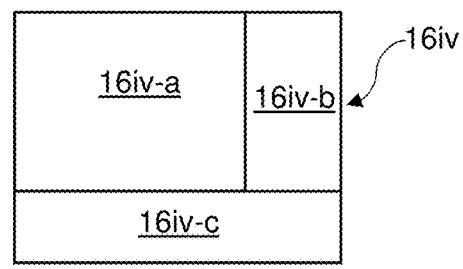
FIG. 13D shows a separated interface display configuration with two three display portions thereof simultaneously displaying respective content in accordance with a non-restrictive illustrative embodiment of the present disclosure.
Figure 13E:
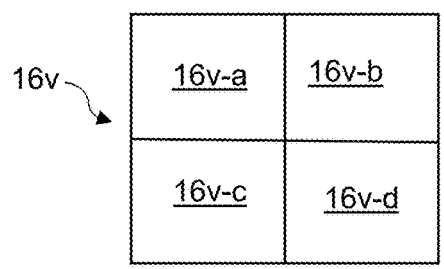
FIG. 13E shows a separated interface display configuration with two four display portions thereof simultaneously displaying respective content in accordance with a non-restrictive illustrative embodiment of the present disclosure.
Figure 13F:
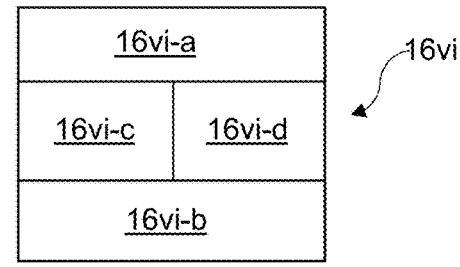
FIG. 13F shows a separated interface display configuration with two four display portions thereof simultaneously displaying respective content in accordance with a non-restrictive illustrative embodiment of the present disclosure.

The multiple display window 206 shown in FIG. 17 the configuration of sub-windows 204*a*, 204*b* (and further sub-windows) can be modified within the multiple display window 206 having the same frame 208, height H and width W in a manner that is similar to the non-limiting examples shown in FIGS. 13*a* to 14 for the various interface portions.

The system controller 20 can provide the foregoing GUI modulation capabilities to the user device 12 via an application that is downloaded on the user device 12 providing the user to modulate media windows and sub-windows as provided herein via input commands therefor.

Figure 18:
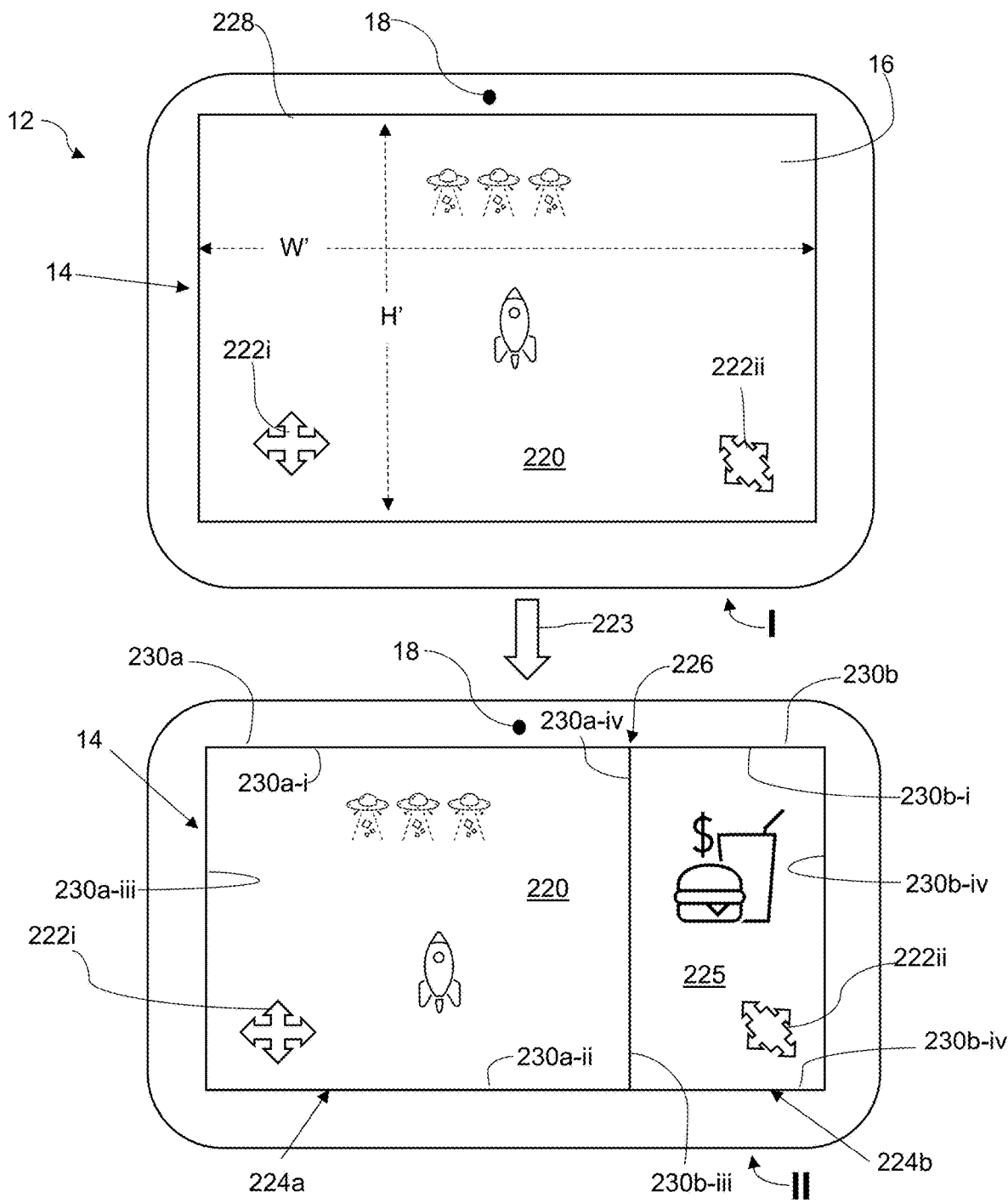
FIG. 18 a schematic representation of a user device with a display interface including a GUI displaying video game content including input command images at I, the GUI being split into two sub-GUI portions at II, with one sub-GUI portion displaying the video game content and the other sub-GUI portion simultaneously displaying the additional or auxiliary content and with the input command images being in the same position as in I, in accordance with a non-restrictive illustrative embodiment of the present disclosure.

FIG. 18 shows the user device 12 with the display 14 screen displaying the GUI 16 which in this example comprising an online video game stream content 200. The online video game content 220 includes icons 222*i* and 222*ii* which are input command images or controls for playing the game. As such, the user can hold the device 12 in the form of a tablet or mobile phone and play the game with their thumbs for example touching the input command images 222*i* and 222*ii* as is known in the art for a variety of games.

When the GUI 16 splits at step 223 the online game content 220 (i.e., the main content) at I continues uninterrupted in a sub-GUI portion 224*a* and II and auxiliary content 225 is streamed in an adjacent sub-GUI portion 224*b* at II thereby together forming a divided or split GUI 226 with independent sub-GUI portions 224*a*, 224*b* thereof. The GUI 16 in the example of FIG. 18, defines a height H' and a width W and comprises an outer frame 228 having a vertical top and bottom borderlines 228*i* and 228*ii* and lateral side borderlines 228*iii* and 228*iv*. When the video game GUI is split (separated/divided) to provide for sub-GUI portions 224*a*, 224*b* it transitions to the divided or split GUI 226 maintaining the same outer frame 228, height H' and width W thereof. Each sub-GUI portion 224*a* and 224*b* defines a respective height and a respective width similar to the GUIs 204*a*, 204*b* previously discussed and shown in FIG. 17. The sub-GUI portions 224*a* and 224*b* comprise respective outer frames 230*a* and 230*b* having respective vertical top borderlines, 230*a-i*, 230*b-i*, respective bottom borderlines 230*a-ii*, 230*b-ii*, respective first side borderlines 230*a-iii*, 230*b-iii* and respective second side borderlines 230*a-iv*, 230*b-iv*.

In the example of FIG. 18, the input command images 222*i* and 222*ii* remain in place within the split GUI 226, in other words they remain in the same position that they were in within the GUI 16 (or within their position in the video game content 220) rather than being repositioned within the sub-GUI portion 224*a* now running (streaming, displaying etc.) content 220. As such, the user can continue playing the game when the GUI splits using their fingers in the same manner as before the splut. The sub-GUI portion 224*b* is shown streaming auxiliary content 205 such as an advertisement. The user can thus view advertisements without stopping the game or decide to pause the game to view the advertisement and even make a purchase via the sub-GUI portion 224*b*.

In an embodiment, the GUIs described herein are split/divided/separated and modulated as provided herein by way the system controller 20 executing a computer implementable step therefor, by way of an user input command therefore or by way of a trigger therefor including a connection of the user device 12 to an external device, user behavior, user device location, and other external factors and/or events as will be further discussed herein.

Figure 19:
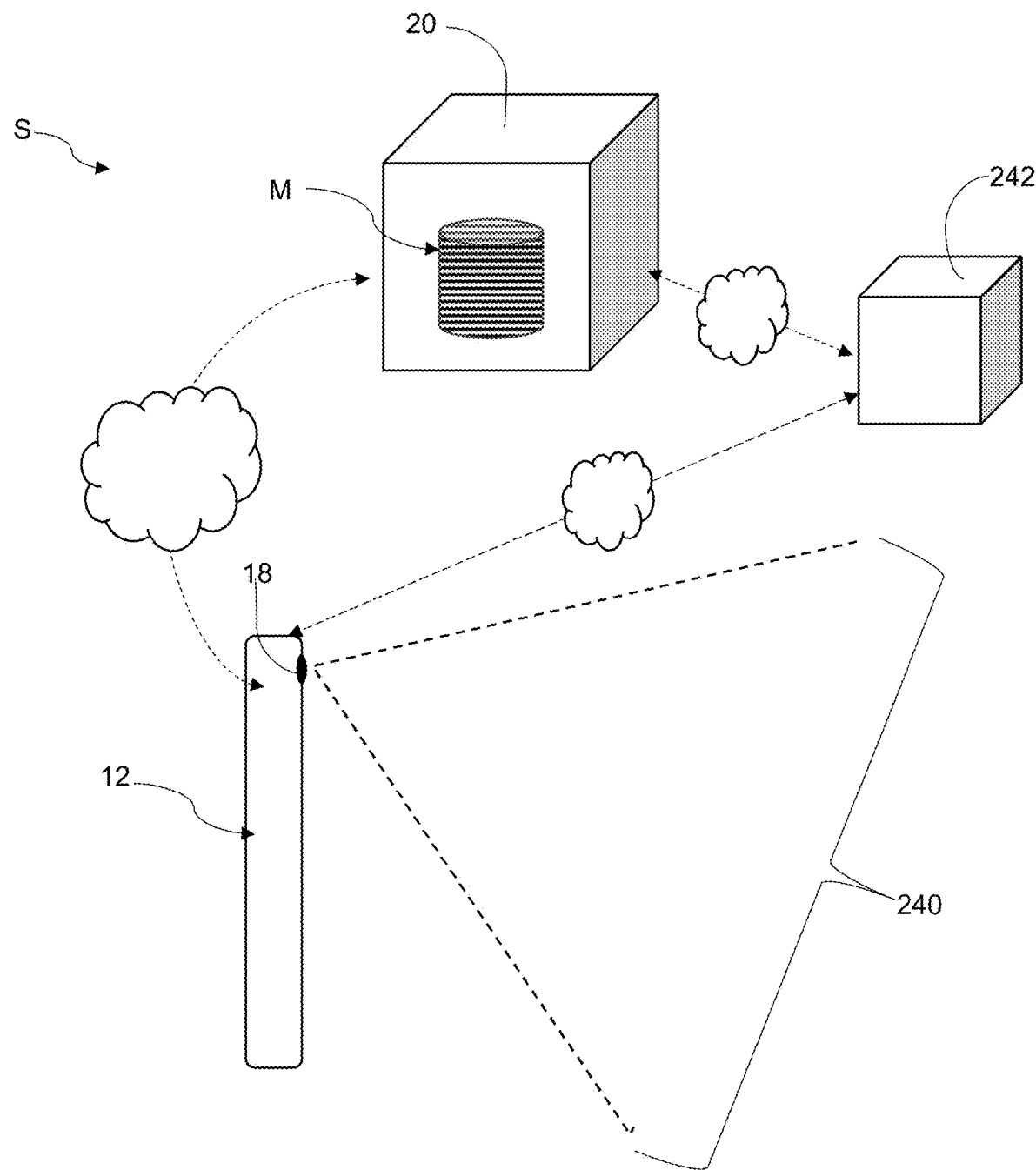
FIG. 19 is a schematic representation of a system for modulating a GUI including a system controller in communication with a user device having a camera to capture status images within the field of view (FOV) thereof, in accordance with a non-restrictive illustrative embodiment of the present disclosure.

Turning to FIG. 19 there is shown a system for modulating a GUI. The camera 18 of the user device 12 captures images within its field of view (FOV) 240 thereby providing for monitoring the user looking at the screen 14 within the FOV 240. The images (e.g., contiguous, or intermittent video, still shots, time stamps etc.) captured by the user device 12 via the camera 18 are transmitted to the system controller 20 for analysis. The system control 20 has a memory M of parameters to modulate the GUI as provided herein based on predetermined parameters. For example, when content is being streamed and displayed via the display screen 14, the controller 20 is aware if the actual content is being viewed by the user or if the user is not in front of the screen or if another individual rather than the assigned user is now in front of the screen 14. This is more common with wall mounted user devices 12 such as smart TVs for example, where individuals enter and leave a room in the course of content being streamed.

The system controller 20 executes the computer implementable step of providing users to set and modulate various GUI modulating parameters and store these parameters in the memory M of the controller 20 or the memory of the display device 12 via input commands. For example, in a family, individual profiles can be set up with images of the individuals thereby identifying the assigned individuals who are the primary users of the device 12, for example the parents and other adult relatives. Children in the home are also identified and their profiles and images are stored in the device 12 or system controller memory M. Thus, the system controller 20 of device 12 can thus detect which individual or individuals are viewing the display screen 14 during content streaming via facial recognition. In the cases where the identity of the individual has not been stored, the system controller 20 or the device 12 can assess what type of individual is in front of the screen 14, for example it can differentiate between a baby, an animal (dog, cat), an older child and an older individual (i.e., adult) via preprogrammed parameters or artificial intelligence (AI) machine learning.

For example, if the user device 12 (e.g. smart tablet, wall mounted smart TV etc.) is on and is streaming a film and the viewer (or assigned user) is currently viewing, the system controller 20 receives the event status of the viewer/user. In this example, the controller 20 is in a network communication with a given third party server, generally denoted 242 which provides the content (movie, sporting event etc.) being streamed via the display screen 14. Having detected that the viewer/user is indeed watching the streamed content, the controller 20 will execute the computer implementable step of splitting the GUI to provide for an auxiliary for streaming an advertisement for example. Indeed, the advertising content may be provided by the same or another given third party server 242 or by the controller 20 in certain cases.

Detecting the status of the viewer/user via the camera 18 as provided herein includes facial recognition or type recognition by the system controller 20. The foregoing parameters having been already preprogrammed in the memory M of the system controller 20 or acquired via AI and machine learning. Thus, the type of advertising content selected by the system controller 20 can be directed to a given individual based on face recognition or based on type recognition (gender assessment, age group assessment and the like).

In an embodiment, the main content being streamed via the GUI 16 (independent of any splitting of the GUI 16) is modulated based on viewer status including without limitation, the facial status, the type status, the condition status.

The facial status includes face recognition and as such, GUI modulation is based on which given individual of a predetermined set of previously identified individuals (for example, those who have uploaded user profiles) are viewing the screen display 14 in real time.

The type status includes viewer type recognition i.e. what type of individual is viewing; for example, the viewer belongs to a given type category that has been pre-categorized and stored in the memory M of the controller 20. A type category may include for example a gender category, an age category, a height category, a species category (i.e. is the viewer an actual person or a pet etc.).

The condition status of the individual includes the presence or non-presence of the individual, whether the individual is awake or asleep, whether the individual is seated in front of the user device 12 or standing or moving around (thus not currently paying attention), whether the individual is having a conversation with someone, or whether the individual is present, non-present, sleeping, standing, reading, on the phone, in a conversation without looking at the screen. Indeed, the 18 can monitor the eyes of the viewer as described for example in U.S. Ser. No. 17/443,563 in order to determine if the viewer is indeed paying attention to the screen or not. The condition status therefore includes the eye condition status such as the direction of the eyes or the position of the eyelids (open, closed, partially open/closed etc.).

Thus, the controller 20 can execute the computer implementable step of modulating the GUI 16 to either modulate the GUI depending on the viewer status. Modulation of the GUI includes splitting the GUI so as to provide simultaneous streaming of auxiliary content with main content, pausing the stream of the GUI (or portions thereof, if it has been split), restarting a paused stream of the GUI or sub-GUI portions thereof, increasing the volume of the stream of the GUI or sub-GUI portions thereof, streaming or not streaming certain content via the GUI or sub-GUI portions thereof, replacing one stream by another stream of the GUI or sub-GUI portions thereof, turning off the GUI or sub-GUI portions thereof or otherwise blacking out the GUI or sub-GUI portions thereof, changing the dubbed language of a stream or the closed captioning/subtitling, rewinding, fast-forwarding or continuing a stream and the like.

Modulation based on viewer status of the GUI or of the multiple simultaneous GUI as provided herein will be further described by way of the following non-limiting examples. If a viewer turns their smart TV on but is not present, the controller 20 can modulate the GUI to pause the stream and re-start once the viewer is again present and viewing the screen 14. The controller 20 can pause the stream when the user is not sufficiently paying attention to stream and is instead the walking around or on the phone or sleeping. The controller 20 can pause the stream when the viewer is on the phone or not sufficiently paying attention and then rewind it for a few minutes and restart it once the viewer has ended their call or has returned their full attention to the screen.

In the case that the viewer is awake but not sufficiently paying attention the controller 20 can modulate the GUI to increase the volume of the stream or decide to split the GUI to provide auxiliary content (such as an advertisement) in a sub-GUI portion and increase the volume of the auxiliary content while pausing the main content in the main sub-GUI portion to stop the stream. Indeed, when the viewer is actually watching the display 14, the controller 20 will provide adequate auxiliary content following splitting in a sub-GUI portion.

The auxiliary content streamed in a sub-GUI portion can be selected from a variety of content selections stored in the memory of the controller 20 or otherwise available to the controller via a third party server 242 based on the viewer status. For example, advertisements directed to children, teens, adults and seniors will be displayed to the proper audience. As such, when a child is watching the controller 20 will stream ads related to toys via a sub-GUI portion following splitting, when a grandparent is watching appropriate medical advertisements will be streamed via the sub-GUI portion and so on a so forth.

Parents can set profile parameters for their children and as such, when a child enters the FOV 240 of the camera 18, the system controller 20 can remove inappropriate streams from the GUI and replace them by appropriate ones, or not allow a minor to view certain programs by blocking the stream or by blacking out the GUI and closing the volume. The system controller 20 can also send a signal such as an email direct message to a parent that a minor is trying to access non-authorized streams or simply keep a data log accessible to the parents for example. Indeed, if a viewer tries to bypass the controller 20 by turning off the camera 18, the system controller 20 will not allow the device 12 to stream.

In another embodiment, the camera 18 may act as a security camera turning the device 12 on to set off an alarm or to communicate with a third party user or with the user via another device. For example, an identified viewer may enter the FOV 240 during hours of the day where the device 12 (such as smart TV in this case) is not to be used.

With facial recognition, the controller 20 can provide appropriate auxiliary content (such as advertisements) to the viewer based on the viewer's registered profile or browsing history which is kept in the memory of the device or in the memory of the controller 20 depending or a combination thereof.

In another example, the controller 20 may change the language (dubbing, closed captioning/subtitles) based on the identity of the user.

In an embodiment, the viewer status is detected by the viewer input commands via the GUI 16. For example, if the viewer is tapping/touching the display screen 14, or is typing via a keyboard or is clicking via a mouse, this is indicative of the presence and attention of the viewer and thus GUI splitting is useful at this time.

In an embodiment, viewer status is detected by a sensor instead of a camera 18 which can detect the presence or absence of the user in front of the display screen 14 during content streaming. Thus, splitting can be effectuated during the presence of the viewer.

As mentioned above, the modulation of the GUI can also be based on voice input commands and thus the viewer can modulate the above via voice command if the viewer is authorized to modulate as per their user profile. Thus, users can request for their smart TV to pause, rewind, fast forward and change channels as well as split the GUI to access auxiliary content and the like.

In an embodiment, rather than the system controller 20 executing the computer implementable steps of modulating the GUI, the application therefor is downloaded from the controller 20 to the user device 12 and stored in the memory thereof, as such, the device 12 can split the GUI block or display content as explained above. Indeed, the foregoing can also be accomplished by synergistic relationship between the controller 20 and the user device 12. For example, GUI splitting is performed at the device 12 level and content type control is performed at the controller 20 level. Hence, the system controller 20 and the user device 12 can both modulate certain aspects of the GUI as defined herein.

In an embodiment, the system controller 20 or the device 12 detects the content type being displayed via the GUI and modulates the GUI based on the current content type being displayed. For example, if a user is using a particular app on their smart phone and they receive an audio or video call rather than replacing the app GUI by the call GUI as is known in the art, the currently displayed GUI is split with one sub-GUI portion containing the main content (the app GUI currently being used) and the other sub-GUI portion containing the auxiliary content (the incoming call GUI).

In an embodiment, the system controller 20 or the device 12 detects the user device status such as position, location or movement.

In one example regarding the user device position status, when the user device 12 is a smartwatch, when the user has their arm in a generally vertically directed position, they are not currently looking at the display 14 and thus, there is no need to split the GUI. When the user wants to look at their smartwatch the device 12 is in the generally horizontal directed position and thus the GUI can be split to display auxiliary content.

In one example regarding the device location status, the user may be carrying with them a smart device 12 (phone, tablet etc.) and the GUI splits to display auxiliary content when the device 12 is in a physical predetermined proximity to a given location. For example, the user may be near a museum of interest the and the GUI is split to allow auxiliary content to be displayed containing information about the museum or how to book tickets or particular expositions on the day. If the user is near a given commercial location, the GUI is split to display auxiliary content regarding this given commercial location (advertisement, special offers, purchasing platforms etc.). Thus, system participating merchants can request that the controller system display their auxiliary content via the user devices 12 when the user devices 12 are in proximity to given locations. The users can modulate their profiles to have the auxiliary content of the participating merchants be displayed accordingly. The users can also modulate their profiles to have the GUI split to display auxiliary content in a sub-GUI portion as provided in U.S. patent application Ser. No. 17/459,702, which is incorporated by reference herein in its entirety. In an embodiment, location may be determined by GPS application stored in the memory of the user device 12.

In one example, regarding device movement status, the GUI is split based on the speed of the user device 12. For example, the user device 12 may be in a vehicle and the GUI will only be split for auxiliary content when the vehicle is under a certain speed or at a constant speed such as an auto-pilot or the vehicle has stopped.

In an embodiment, the GUI is based on a user device application status. For example, if a user is accessing a given application on their device or a virtual application (as provided in U.S. Ser. No. 17/459,702), the GUI is split to provide auxiliary content. For example, when viewing a map app on a smartphone, the GUI is split to provide links to commercial establishments in the section of the map the user is viewing.

In an embodiment, the system controller 20 or the device 12 detects an auxiliary device status. The auxiliary device may be a smart TV remote control, a game console, a virtual machine and the like as can be contemplated by the skilled artisan within the scope. The use of the auxiliary device is indicative of the fact that the user is viewing the steamed content and thus GUI splitting is now useful.

As previously mentioned, GUI splitting is also providing for simultaneously viewing and interacting with two or more separate applications.

In an embodiment, GUI splitting is performed based on the position of the user device 12. For example, when a tablet or a smartphone is moved from the landscape to the profile position, the screen auto-rotates therewith. As such, the GUI can be split into side by side portions or top and bottom portions for example depending on the position of the device 12.

In an embodiment, the system controller 20 will execute splitting upon a request from a third party server to display auxiliary content to a user via the user device 12 without interrupting the main content.

In an embodiment, the system controller 20 executes the computer implementable step of allowing a user to recall an auxiliary content displayed via a sub-GUI portion. For example, as the user is viewing main content on their GUI, the GUI is split to provide at least two sub-GUI portions, one of the sub-GUI portions continues to display the main content without interruption and the other of the sub-GUI portions displays the auxiliary content which is an advertisement for example. The auxiliary content is displayed for a short time frame (e.g., 5 sec-25 sec) and then the sub-GUI portion displaying this auxiliary content closes while the other sub-GUI portion enlarges to take the space of the original GUI displaying the main content without interruption. The user via input commands therefore through the device interface can request from the system controller 20 to re-display the auxiliary content. This is convenient for advertisements that are streamed to quickly. The user can thus even via input commands therefore go to a purchasing web-page from the streamed advertisements within the same sub-GUI portion to peruse more information about the products and services being advertised and/or make a purchase.

In an embodiment, when auxiliary content is being displayed in a sub-GUI portion, the main content displayed in the other sub-GUI portion may be paused and/or rendered inaccessible to receive user input commands.

The examples shown herein show devices 12 with display screens 14 which provide a two-dimensional GUI 16 as is very well known for laptops, desktops, tablets and handheld devices.

In an embodiment, the GUI 16 is provided by Extended Reality (XR) devices. Extended Reality (XR) is an umbrella term encapsulating Augmented Reality (AR) including Immersive Augmented Reality, Virtual Reality (VR) including Immersive Virtual Reality, Mixed Reality (MR) and variations and combination thereof as is known in the art. Thus, the term XR refers to all the foregoing variations.

Figure 20:
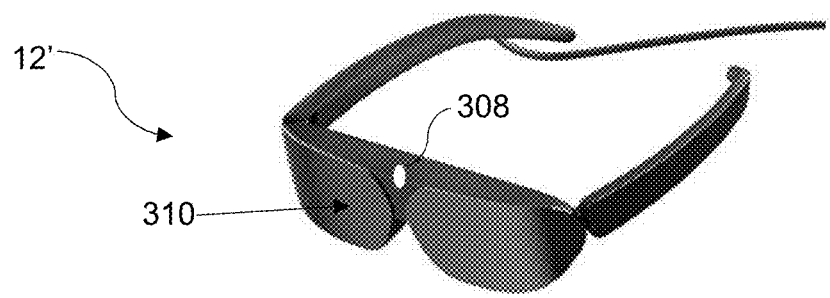
FIG. 20 is a perspective front view of a user device in the form of smart glasses such as XR glasses in accordance with a non-restrictive illustrative embodiment of the present disclosure.
Figure 21:
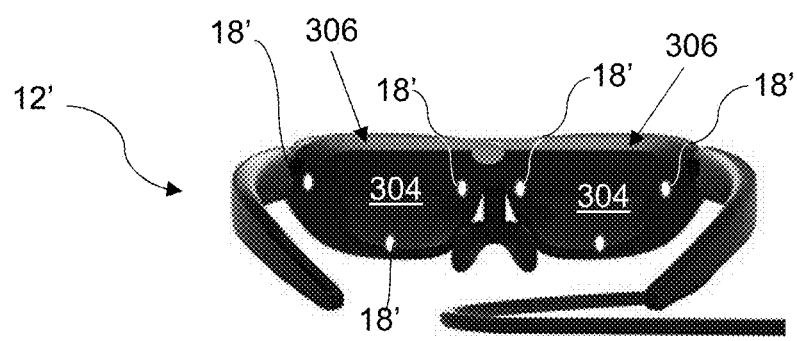
FIG. 21 is a rear view of the smart glasses of FIG. 1, in accordance with a non-restrictive illustrative embodiment of the present disclosure.
Figure 22:
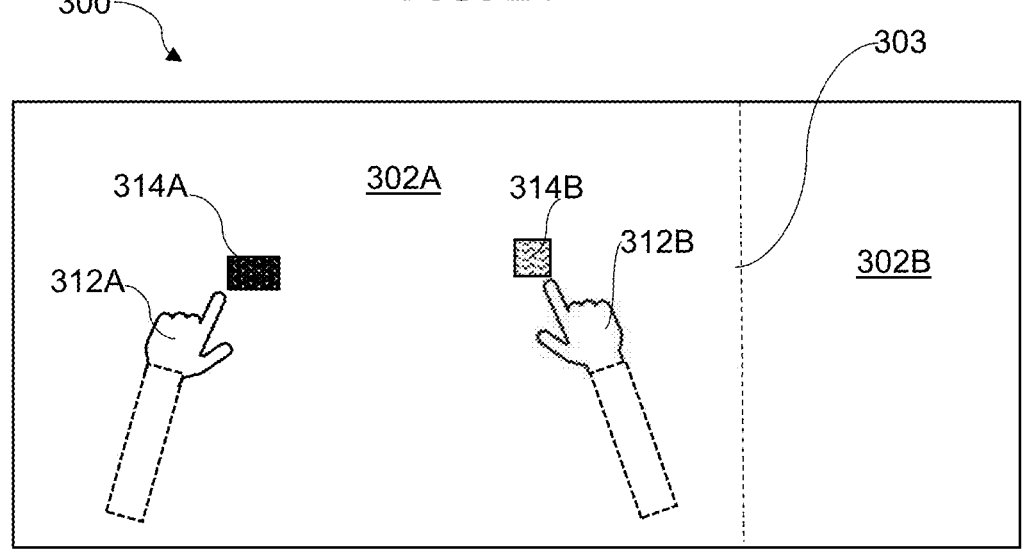
FIG. 22 is a schematic representation of the virtual screen including a GUI produced by the smart glasses of FIG. 20, in accordance with a non-restrictive illustrative embodiment of the present disclosure.

Turning to FIGS. 20 and 21, there is shown an example of XR or smart glasses devices 12' that comprises a display interface for providing a virtual screen or GUI 300 as shown in FIG. 22. Certain contemporary XR glasses deliver a visual experience comparable to a 120" TV of about 3 meters in front of the viewer. Examples of smart glasses are Google™ glasses, Nreal™ glasses, Nebula™ glasses, Viture™ glasses, Lenovo ThinkReality A3™ and many others.

As shown the viewer has the impression of seeing a virtual GUI 300 in front of them. The smart glasses system provide the viewer to interface with the virtual GUI much like a real physical screen with a GUI. For example, instead of physically touching a screen 14, their hand or finger moves in the direction of a portion of the virtual screen 300 that cannot be actually touch but a touch is emulated within an Expanded Reality context as is well understood in the art.

As shown in FIG. 22, the virtual GUI 300 can be split to provide a main sub-GUI portion 302A and an auxiliary sub-GUI portion 302B as indicated by phantom line 303 which delineates a border between two sub-GUI portions of GUI 300. Indeed, the virtual GUI 300 functions as the GUI 16 described herein. Thus, the description for user device 12 is applicable to the smart glasses device 12' mutatis mutandis.

Turning back to FIG. 21, the smart glasses 12' may include one or more cameras 18' on the inner surface 304 thereof such as on the inner surface of the one or both lenses 306 in order to capture or record images including video images of the wearer's eyes. As mentioned before, the system controller 20 can analyze the images provided to determine a viewer type or status based on eye movement and shape indicators that are stored within the memory of the controller 20. Indeed, the device memory may include an application provide by the controller 20 for this analysis. Of course, the cameras 18' can also provide for command inputs input as described in U.S. Ser. No. 17/443,563 such as a cursor on the GUI 300 that moves with the field of view orientation φ as described in U.S. Ser. No. 17/443,563 to move across sub-GUI portions.

With reference to FIG. 20, the smart glasses 12' may include a camera 308 at an external portion 310 thereof as shown in order to capture the real hands of the user in the field of view of camera 308. XR images 312A and 312B of the user's hands is produced within the virtual GUI 300. In addition to the hands, images 312A and 312B may also include arms or portions thereof. The movement of the images 312A and 312B within or along the virtual GUI 300 is synchronized with the real time movement of the user's actual hands. As such, the user is provided with inputting commands via the movement of the images 312A and 312B which emulates how the user would use their actual hands on a touch screen For example, the virtual screen 300 has the appearance of being a given distance in front of them. The user has the impression of seeing an actual screen and therefore would intuitively want to touch control it in the same way they use their regular touch screens on their computer or tablet etc. The user would thus have the instinct due to intuitive habit to move their hands towards the virtual screen 300 and in essence would be moving their hands in front of their XR glasses into emptiness. Indeed, they would not even see their hands. Therefore, the camera 308 captures the hand movement (including fingers and may also include arms or portions thereof if desired) and transfers the images to the device and/or system controller which execute alone or in combination the computer implementable step of providing the images 312A and 312B in front of the virtual GUI 300 so that the user can have the visual sensation that they are actually moving their hands along an actual screen but it is rather that the images 312A and 312B are emulating the movement of their actual hands along the virtual screen 300. Therefore, touch like movements of a user's hands trigger real input commands. The user can via their real hand movements guide their hand images 312A and 312B along the virtual screen 300.

In one example, the user wants to touch a given virtual icon 314A or 314B and brings their real hands to where they see this virtual icon on their virtual screen and this is captured by the external camera which transfers the real image to the controller (device, system or both) and which produces an XR image (312A, 312B) of their hands in the virtual GUI 300 giving the visual impression of hands in front of the screen 300. The user guides the virtual hand image (312A, 312B) with their real hand movements. As the user makes the movement of touching the virtual icon (314A, 314B) with their real hand, this is emulated by the XR hand image (312A, 312B) and this provides an input command to that icon (314A, 314B).

Figure 23:
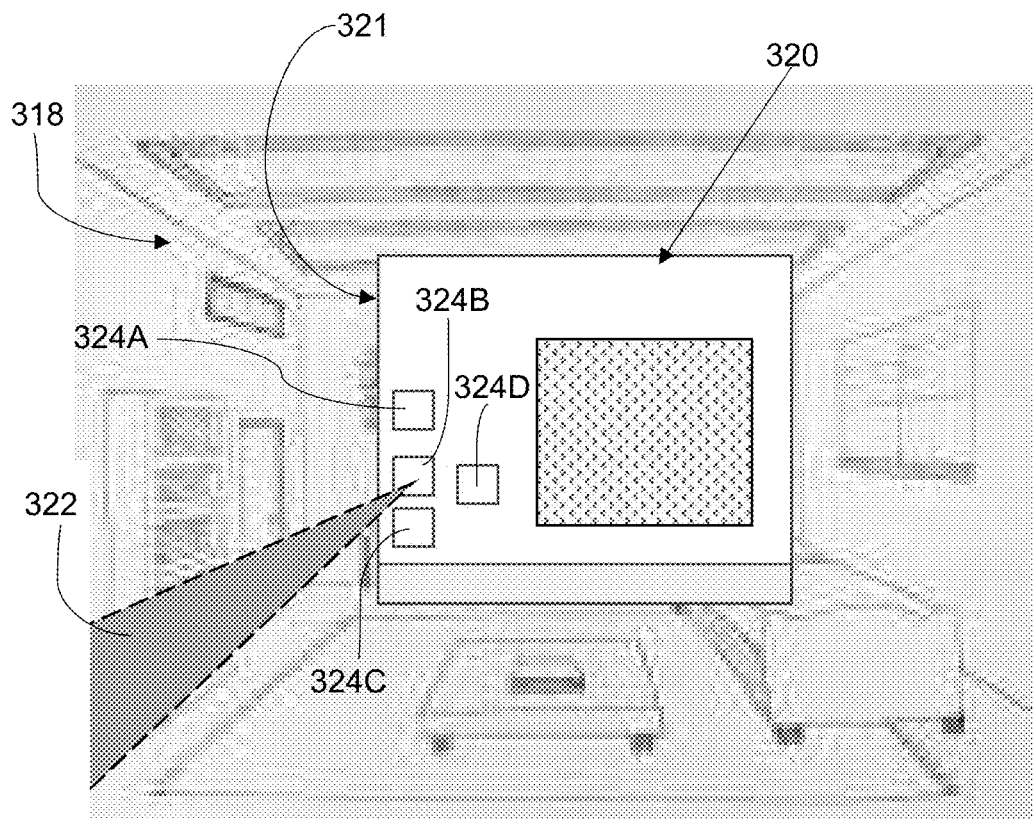
FIG. 23 is a schematic representation of a virtual screen produced by the smart glasses of FIG. 20 mixed with the real surrounding environment, in accordance with a non-restrictive illustrative embodiment of the present disclosure.

With reference to FIG. 23, the smart glasses 12' provide for mixing the real environment 318 with a virtual image 320. As such, the user can still see the ambient environment 318 when they are wearing their smart glasses 12' along with an XR GUI 320 that appears to be floating within the real environment 318 and overlying a portion thereof. Once again, the user will move their real arms and hands (schematically represented here by element 322) towards one or more input images (e.g. 324A, 324B, 324C, 324D) within the GUI 320 in order to input a command similarly to the way they would use a touch screen. The external camera 308 captures the hand movements of the user. The device and/or system controller execute the computer implementable step of building a cartesian table of the virtual screen 320 as well as of the space 321 in the ambient environment 318 occupied by the virtual screen 320. The device and/or system controller executes the computer implementable step of creating a correspondence between given coordinates along the cartesian table of the space 321 along which the hand position overlies and executes a touch control movement and the corresponding coordinates along the cartesian table of the virtual screen. In this way, when the user moves their hand to touch click the virtual screen 320 floating in the ambient environment 318 in front of them, the camera 308 captures the movement of their hands and the controller (of the device and/or system) provides for "seeing" what the user sees via the foregoing correspondence synchronization, namely, the controller determines that the user's hand is trying to touch click icon 324B and therefore provides for this input command to be executed in the same way a user would execute the command on a real touch screen.

Indeed, the foregoing can also be used in the example of FIG. 22, and as such, the user may not see images of their hands, but the controller (of the device and/or system) can determine the position of their hands vis-à-vis the virtual screen 300 by creating a cartesian table in the space of the ambient environment of where the screen would be positioned since the user has the visual sense that the screen 300 is in front of them within their virtual environment.

Thus, a condition of the user in the examples related to FIGS. 22 and 23 is the movement of the hands of the user including in certain cases the movement of their fingers and even their arms.

Figure 24:
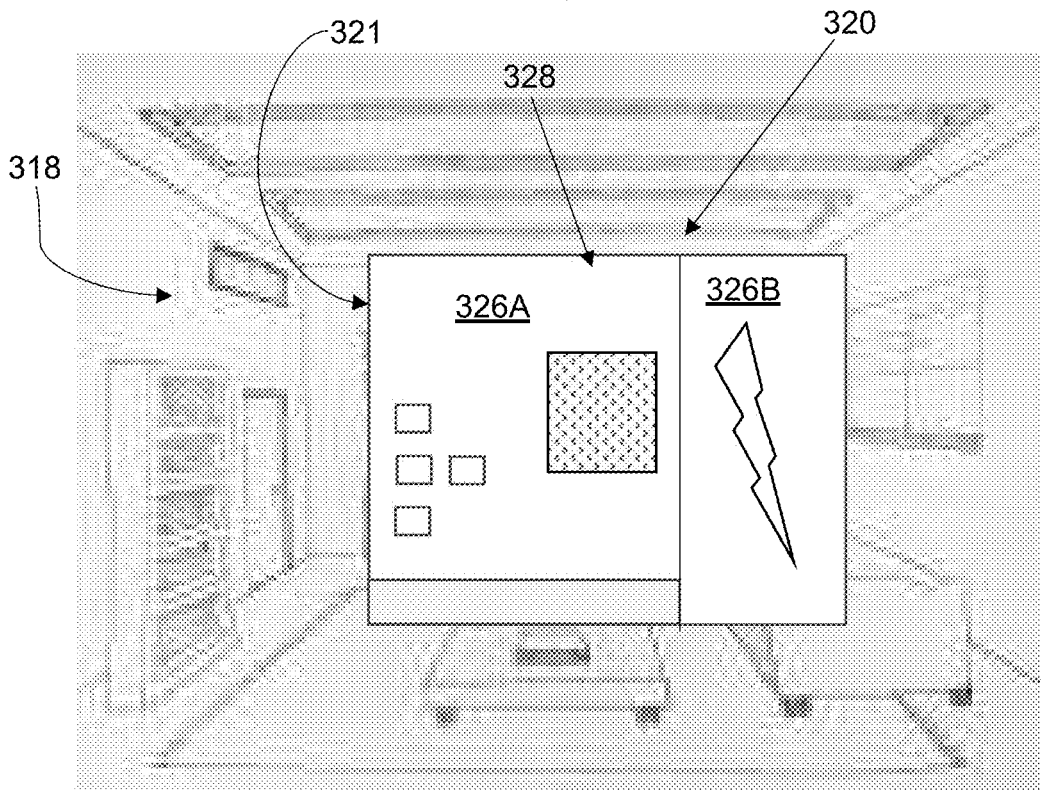
FIG. 24 is the schematic representation of the virtual screen within the real surrounding environment of FIG. 23 with the GUI being split into two sub-GUI portions, in accordance with a non-restrictive illustrative embodiment of the present disclosure.
Figure 25:
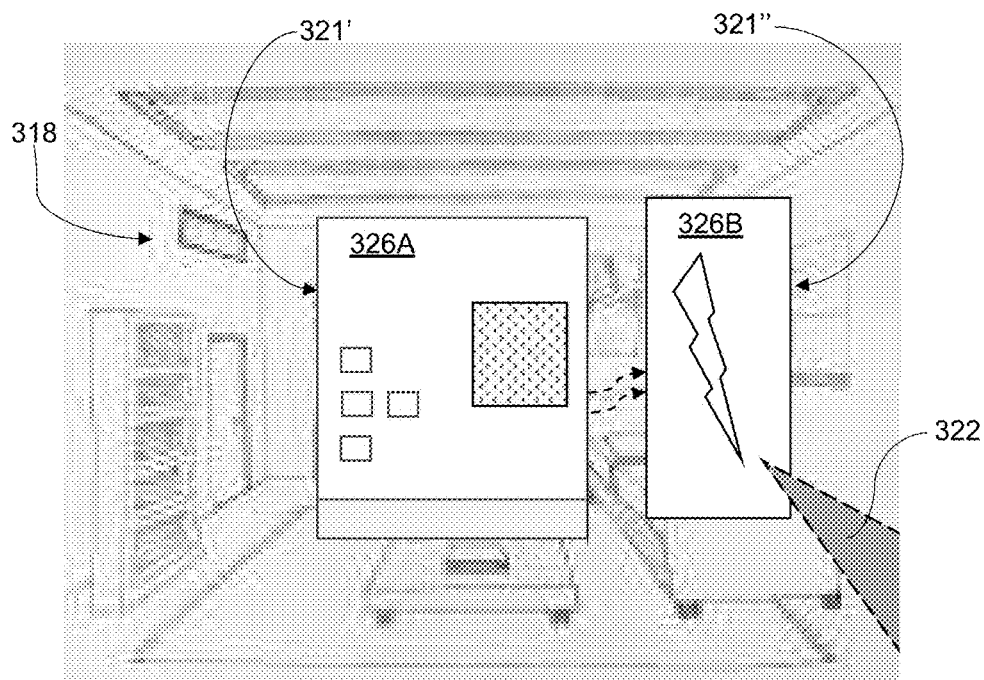
FIG. 25 is the virtual screen within the real surrounding environment of FIG. 24, with one of the sub-GUI portions being undocked from the other sub-GUI portion, in accordance with a non-restrictive illustrative embodiment of the present disclosure.

Turning now to FIG. 24, and as previously mentioned, the GUI 320 can be split/divided into two sub-GUI portions 326A and 326B thereby defining a multiple GUI display 328 occupying space 321. Moreover, and as shown in FIG. 25, the user can via hand virtual touch control (see 322) as described hereinabove undock one of the two sub-GUI portions, 326B from the multiple GUI display 328 and move it such that it appears to be moving within the ambient environment 318. Therefore, one sub-GUI portion 326A virtually occupies a space 321' within the ambient environment 318 and the other sub-GUI portion 326B virtually occupies a space 321" within the ambient environment 318.

Figure 26:
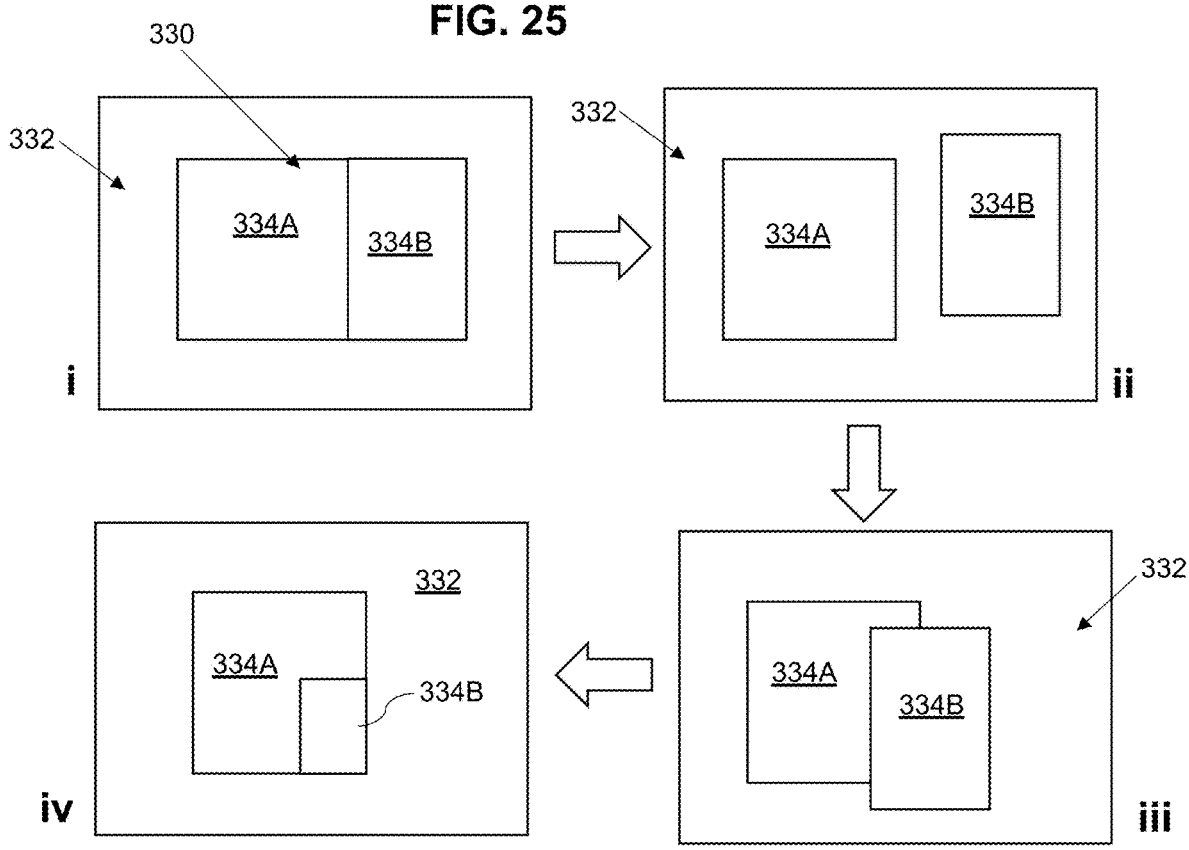
FIG. 26 is a schematic representation of a sequential modulation of an assembled multiple window display on a host GUI with two sub-window portions at sequence or step image (i), one of the sub-window portions is undocked from the other sub-window sub-portions at sequence or step image (ii), the undocked sub-window portion partially overlies the other sub-window portion portions at sequence or step image (iii), the overlying sub-window portion is ingested by the other sub-window portion at (iv), in accordance with a non-restrictive illustrative embodiment of the present disclosure.

Turning to FIG. 26 and with general reference to the description herein regarding FIG. 16, there is shown at step (i) a multiple window display 330 on a GUI host or platform 332 comprising two sub-window portions 334A and 334B. As previously described, the user can undock a given sub-window portion, such as 334B, for example, as shown in step (ii). By moving the undocked sub-window portion 334B over the sub-window portion 334A as shown at step (iii), the controller (device and/or system) executes the computer implementable step of causing the sub-window portion 334B to be ingested by or inserted in sub-window portion 334A and thereby occupying a part thereof as shown at step (iv) and in this way the sub-window portion 334A together with the sub-window portion 334B inserted therein provide a multiple window display. Of course, the user can extricate the sub-window portion from the sub-window 334A by a user input command therefor such as finger tap and slide movement for example or a mouse click and slide as another example.

Figure 27:
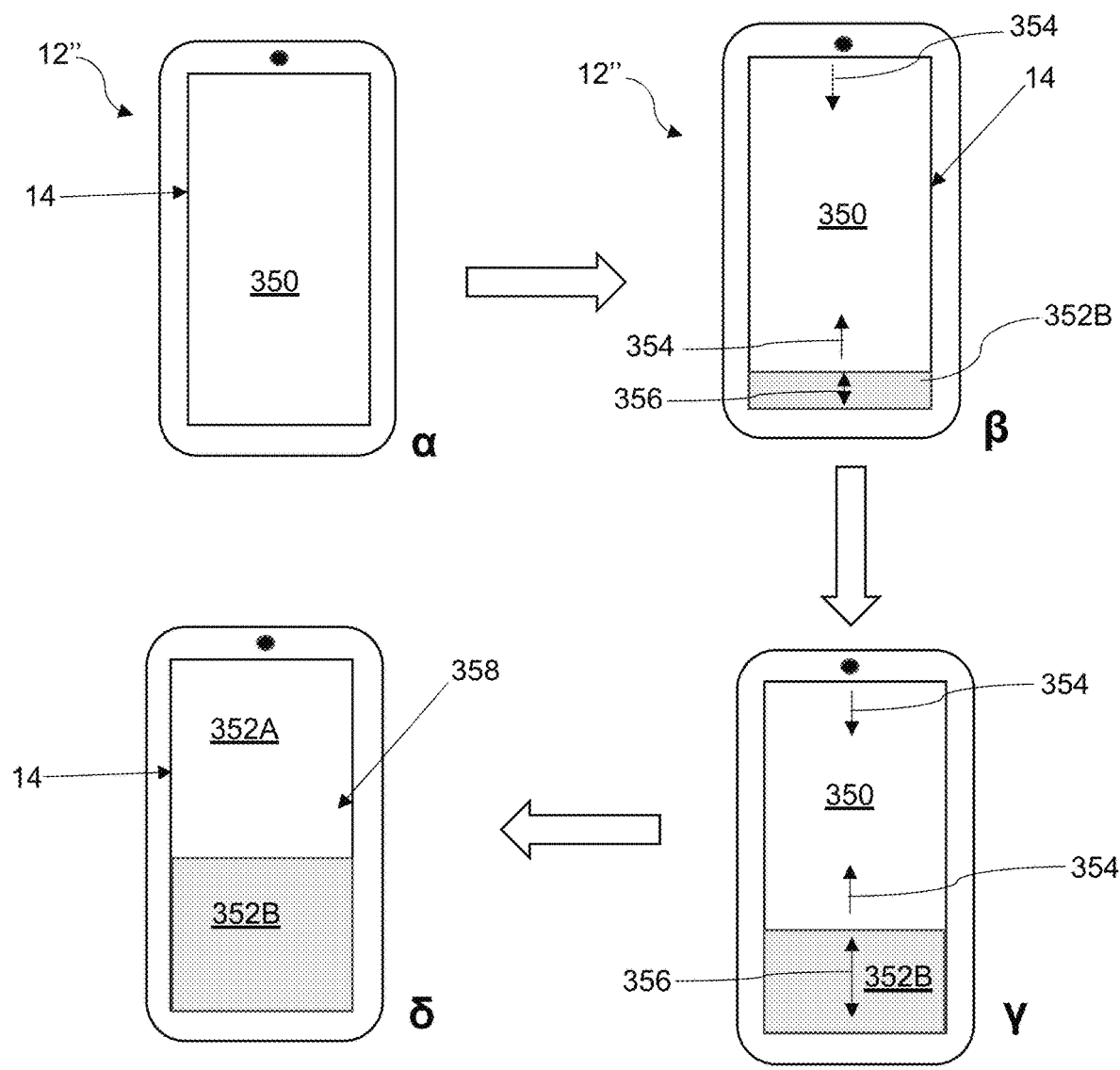
FIG. 27 is a schematic representation of sequential splitting of a GUI displayed via a screen on a user device showing various time stamps of the splitting from α-δ, in accordance with a non-restrictive illustrative embodiment of the present disclosure.

Turning now to FIG. 27, the term splitting or dividing a GUI or a media window as provided herein also includes resizing an GUI/window by progressively decreasing the width or length thereof and simultaneously progressively increasing the width or length of a new GUI/window which will share the space taken by the original GUI/window to a predetermined size of the original GUI/Window and new GUI/Window.

FIG. 27 shows a device 12" such as a mobile device with a display screen 14 displaying a GUI 350 at step (α) which spans the width and length of the screen 14 in this example. When the GUI is 350 is split into sub-portions thereof, the new GUI sub-portion 352B appears as along a sliver of the screen 14 concurrently beginning by the same sliver of the original GUI 350 and progressively increases in size (along its length or height in this example) correspondingly progressively decreasing the size of the original GUI 350 (along its length or height in this example) as shown in steps (β) and (γ) and as indicated by the inward arrows 354 which represent a decrease in size and the outward arrows 356 which represent an increase in size. The foregoing mutual resizing occurs in one quick swoop until the resulting multiple GUI display 358 is created which is the size of the original GUI 350 at step (α) but now having been split within the same boundary frame 360 between two sub-portions, namely sub-GUI portion 352A (which is the original GUI 350 displaying the original content thereof in a decreased sized version) and sub-GUI portion 352B which is the new GUI.

Figure 28:
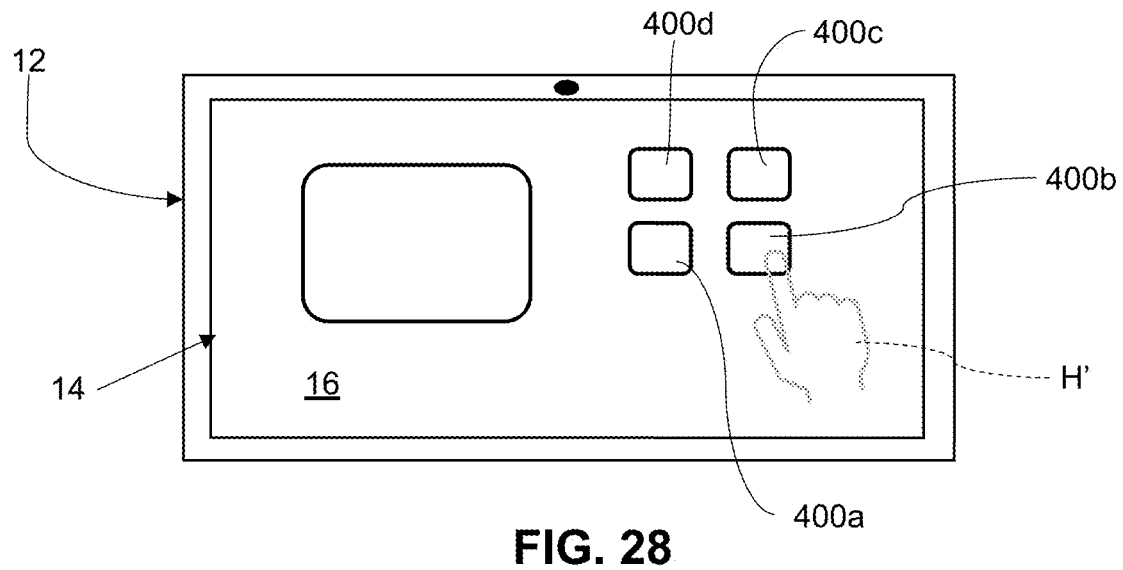
FIG. 28 is a schematic representation of a user device with a screen displaying a GUI and a user's hand in front of the screen for modulating the GUI without touching the screen, in accordance with a non-restrictive illustrative embodiment of the present disclosure.
Figure 29:
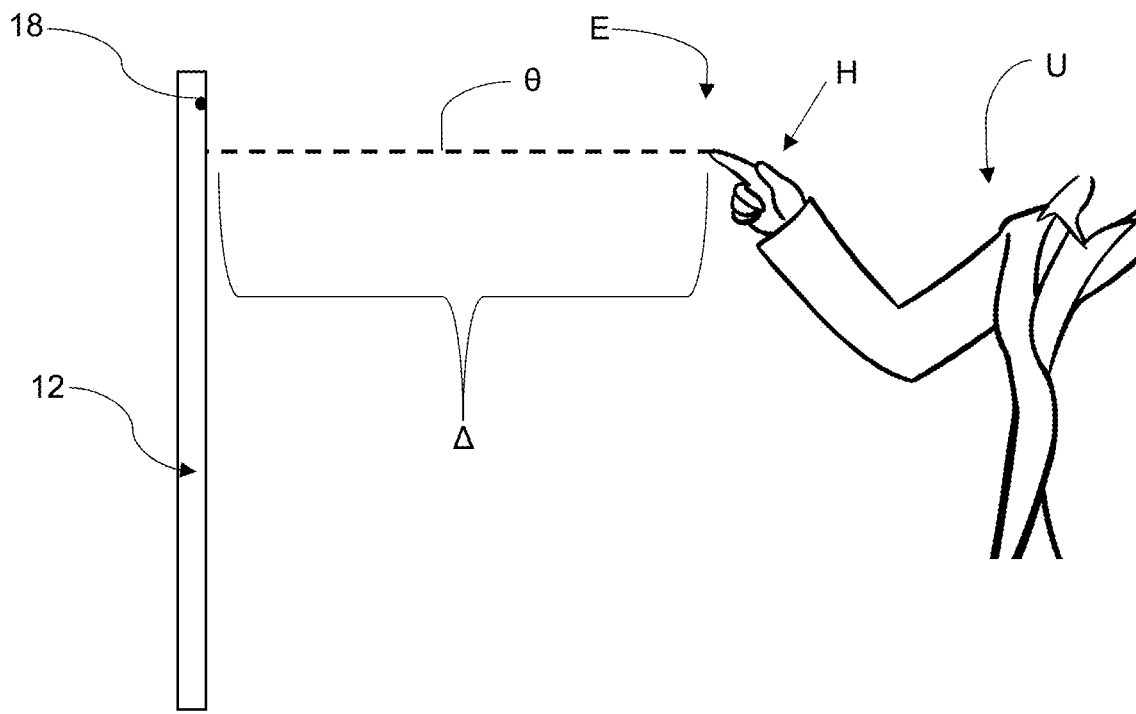
FIG. 29 is a side view of the schematic representation of FIG. 28 showing a user in front of the user device pointing to the screen from a distance for modulating the GUI without touching the screen, in accordance with a non-restrictive illustrative embodiment of the present disclosure.

In another embodiment shown in FIGS. 28 and 29, the camera 18 of the user device 12 (smart TV, tablet, etc.) captures images the hand H movements of the user U and the user may click in the air E at distance Δ from the smart TV 12 as shown in FIG. 29. Their finger and/or hand H points in a given direction θ of the of the GUI 16. Indeed, as shown in FIG. 28, the user U is emulating the hand movement H' of clicking on an input command image 400*b*. Therefore, instead of tapping on the screen 14 to touch click on an icon or a thumbnail 400*a*, 400*b*, 400*c*, 400*d*, the user does this in movement in the space E in front of their eyes at a distance Δ from the screen 14 (i.e. by not actually touching the screen). As such, the disclosure provides for modulating user commands via command input images displayed on a graphical user interface (GUI) based on a hand and/or finger direction along with hand and/or finger movement (such as screen touch or finger click movement on a regular screen) relative to the displayed command input images and the GUI. The system and/or device controller or the synergistic combination thereof perform computer implementable steps similar to those described in U.S. Ser. No. 17/443,563 yet, instead of using eye orientation, hand/finger orientation is monitored in combination with hand/finger movement.

Thus, this system provides for capturing real time images of the user's hand/or finger. The computer implementable steps comprise: determining a respective position for each of the command input images displayed on the graphical user interface; receiving real time captured images of the hand and/or finger of the user; separating the graphical user interface into interface portions thereof; determining in real time a general hand/finger orientation of the user based on the real time captured images; determining a real-time correlation between the determined general hand/finger orientation and one or more of the interface portions thereby determining a pointing direction of the user and one or more real-time interface portions being pointed to; and determining in real-time if the one or more interface portions pointed to contain one or more of the command input images. When the user inputs a user command via a selected one of the command input images, the following computer implementable steps are executed by the controller: determining in real time if the selected command input image is positioned within the one or more pointed to interface portions or if the selected command input image is not positioned within the one or more pointed to interface portions; allowing the user command to be processed if the selected command input image is positioned within the one or more pointed to interface portions; and preventing the user command to be processed if the selected command input image is not positioned within the one or more pointed interface portions.

User input commands include voice commands, movement commands and the like. In one example, when the user moves their hand or their finger to emulate a command such as touch or a click the user input command is processed for the pointed to input command image.

Thus, the user U points in the space E in front of them in the direction θ an icon 400*b* on the GUI with their hand H which emulates a click movement to run the program of this icon. Alternatively, the user points to an icon 400*b* and uses another input command such as their voice to run the program.

In the cases where the user's eye orientation is being used φ, as described in U.S. Ser. No. 17/443,563, the hand or finger clicks or touch screen movements in the air E captured by the camera's FOV 240 are indicative of input commands to run the program of the input command image.

In certain cases, when the GUIs herein are split into sub-portions thereof to simultaneously display independent content provided by at least one third party server, the controller 20 may request prior to GUI splitting for the third party server or servers to run the auxiliary content on the user device in order to avoid latency issues of having one sub-GUI portion displaying content while the other sub-GUI is waiting for content to be displayed. As such, content in both or more sub-GUIs are simultaneously displayed.

It is to be understood that independent modulation of one or more of the sub-GUI portions of a given multiple GUI display or of one or more of the sub-window portions of a given multiple window display includes non-limiting example of locking one sub-portion while the other sub-portion remain dynamic, wherein "locking" includes without limitation a stopped/paused stream, a muted stream, a non-scrollable page, and/or the inability to receive input commands and the like and wherein "remaining dynamic" includes without limitation, a continuous stream, an unmuted stream, a scrollable page, and/or the ability to receive input commands as the like.

The various features described herein can be combined in a variety of ways within the context of the present disclosure so as to provide still other embodiments. As such, the embodiments are not mutually exclusive. Elements of the embodiments and examples discussed can be combined within the context of the disclosure as those having skill in the art will readily appreciate. Moreover, the embodiments discussed herein need not include all of the features and elements illustrated and/or described and thus partial combinations of features can also be contemplated. Furthermore, embodiments with less features than those described can also be contemplated. It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been provided hereinabove by way of non-restrictive illustrative embodiments thereof, it can be modified, without departing from the scope, spirit and nature thereof and of the appended claims.

What is claimed is:

1. A system for modulating a graphical user interface (GUI), the system comprising:
   a user device comprising a device controller with an associated memory and a display interface for displaying the GUI, the GUI defining a frame boundary thereof further defining a GUI size, the GUI comprising content displayed via the display interface; and
   a system controller in communication with the user device, the system controller having a processor with an associated memory of processor executable code for being executed by the system controller or for being downloaded into the memory of the user device controller to be executed thereby or to be executed synergistically by a combination of the system controller and the device controller, wherein execution of the processor executable code by the system controller or by the device controller or by the combination thereof synergistically provides for the system controller or the device controller or the combination thereof with performing computer-implementable steps comprising:
   splitting the GUI into two or more sub-GUI portions positioned within the GUI frame boundary;
   providing for the two or more sub-GUI portions to simultaneously display respective content stored within the user device and/or hosted by the system controller and/or a same or different remote host controllers in communication with the user device;

detecting a real-time status selected from the group consisting of a device user status, a device status, an auxiliary device status, a content status, and a combination thereof;

determining the detected real-time status based on status criteria stored within the memory of the system controller and/or the user device; and modulating the GUI and/or the two or more sub-GUI portions on the basis of the determined real-time status.

2. A system according to claim 1, wherein the step of modulating comprises a step selected from the group consisting of:

splitting the GUI into the two or more sub-GUI portions positioned within the GUI frame boundary;

resizing at least one of the two or more sub-GUI portions;

re-configuring at least one of the two or more sub-GUI portions;

removing at least one of the two or more sub-GUI portions; and modulating the displayed content; and a combination thereof.

3. A system according to claim 2, wherein modulating the displayed content is selected from the group consisting of pausing streamed content, switching from one given streamed content to another given streamed content, rewinding streamed content, fast-forwarding streamed content, recalling previously streamed content to be streamed again in real-time and combinations thereof.

4. A system according to claim 1, wherein the user device comprises a sensor for detecting a user in detectable proximity to the device thereby detecting the real-time user status.

5. A system according to claim 4, wherein the sensor detects a sound of the user within the detectable proximity.

6. A system according to claim 1, wherein the user device comprises smart glasses to be worn by the user, the smart glasses comprising at least one camera at an inner surface thereof for capturing images of an eye or eyes of the user, wherein the user status comprises an eye condition of the user.

7. A system according to claim 6, wherein the eye condition status of the user comprises a position of the eyes of the user, a direction of the eyes of user, a movement of the eyes of the user, a position of the eyelids of the user and a combination thereof.

8. A system according to claim 6, wherein the smart glasses further comprise an outer camera positioned at an outer surface of thereof for capturing hand movements of the user.

9. A system according to claim 8, wherein the device user condition comprises hand movements of the user.

10. A system according to claim 1, wherein the user device comprises a camera for capturing images of the device user within a field of view (FOV) of the camera to detect the real-time user status.

11. A system according to claim 10, wherein the device user status is selected from the group consisting of a user condition status, a user facial status, a user type status and a combination thereof.

12. A system according claim 11, wherein the condition status is selected from the group consisting of a presence of the user within the FOV of the camera, a movement of the user within the FOV of the camera, a position of the user within the FOV of the camera, a size of the user within the FOV of the camera, an eye condition status of the user within the FOV of the camera and a combination thereof.

13. A system according to claim 12, wherein the position of the user is selected from a position of the body of the user, a configuration of the body of the user and a combination thereof.

14. A system according to claim 12, wherein the eye condition status of the user comprises a position of the eyes of the user, a direction of the eyes of user, a movement of the eyes of the user, a position of the eyelids of the user and a combination thereof.

15. A system according to claim 11, wherein the determining of the real-time detected user facial status comprises facial recognition of the user and wherein the stored status criteria comprises stored user profiles including registration of the face of the user for facial recognition.

16. A system according to claim 11, wherein the facial status of the user is selected from the groups consisting of an eye condition status of the user, a size of the face of the user, a position of the face of the user, a facial type of the user combinations thereof.

17. A system according to claim 11, wherein the user type status is selected from the group consisting of an age type status, a gender type status, a size type status, a species type status and combinations thereof.

18. A system according to claim 1, wherein the device status is selected from the group consisting of: a position of the device, a location of the device, a motion of the device, a use of the device, and combinations thereof.

19. A system according to claim 18, wherein the use of the device is selected from the group of the device displaying content via the display interface, receiving user input commands.

20. A system according to claim 1, wherein the auxiliary device status is selected from the group consisting of an established communication between an auxiliary device and the user device, an input command to the user device via an auxiliary device, and a combination thereof, wherein the auxiliary device is a physical device and/or a virtual device.

21. A system according to claim 1, wherein when the GUI is split into the two or more sub-GUI portions positioned within the GUI frame boundary it defines a multiple display GUI, wherein the computer-implementable steps comprise:

undocking a selected one of sub-GUI portions from the multiple display GUI thereby spatially separating the undocked sub-GUI portion therefrom, the undocked sub-GUI portion defining its own separate boundary frame and being selectively movable along the display interface.

22. A system according to claim 21, wherein the undocking is performed via a user input command thereof.

23. A system according to claim 1, wherein the GUI comprises media content display window defining the boundary frame and being displayed on a host graphical user interface and the two or more sub-GUI portions comprise two or more sub-window portions, wherein the splitting step comprises splitting the media content display window into the two or more sub-window display portions positioned within the frame boundary of the media display window.

24. A system according to claim 23, wherein when the media window is split into the two or more sub-window portions positioned within the frame boundary thereof it defines a multiple display window, wherein the computer-implementable steps comprise:

undocking a selected one of the sub-window portions from the multiple display window thereby spatially separating the undocked sub-window portion therefrom, the undocked sub-window portion defining its own separate boundary frame and being selectively movable along the host graphical user interface.

25. A system according to claim 1, wherein the GUI prior to the splitting displays video game content with game input control images for receiving finger real or virtual touch input commands for game control wherein the input control images are displayed at respective given positions via the display interface, wherein the computer-implementable steps comprise maintaining the input control images at the same respective and given displayed positions via the display interface following the splitting of the GUI thereby overlying one or more of the two or more sub-GUI portions.

26. A system according to claim 1, wherein the GUI comprises a framework, the computer-implementable steps further comprising:

modulating the framework of the GUI thereby providing for the splitting thereof into the two or more sub-GUI portions and for providing for the two or more sub-GUI portions to simultaneously display the respective content.

27. A system according to claim 1, wherein splitting the GUI into two or more sub-GUI portions positioned within the GUI frame boundary comprises decreasing the size of the GUI while correspondingly replacing the decrease in size by an increase in size of at least one new GUI wherein the decreased GUI comprises one of the two or more sub-GUI portions and the at least one new GUI comprises the other of the two or more sub-GUI portions.

28. A system according to claim 1, wherein splitting the GUI into two or more sub-GUI portions positioned within the GUI frame boundary comprises inserting at least one new GUI within the GUI causing the GUI to be correspondingly reconfigured, wherein the reconfigured GUI comprises one of the two or more sub-GUI portions and the at least one new and inserted GUI comprises the other of the two or more sub-GUI portions.

* * * * *